United States Patent
Gowans et al.

(10) Patent No.: US 12,527,522 B2
(45) Date of Patent: Jan. 20, 2026

(54) SENSOR INTEGRATED DRESSINGS AND SYSTEMS

(71) Applicant: Smith & Nephew PLC, Watford (GB)

(72) Inventors: Philip Gowans, Doncaster (GB); Marcus Damian Phillips, Wakefield (GB)

(73) Assignee: Smith & Nephew PLC, Watford (GB)

( * ) Notice: Subject to any disclaimer, the term of this patent is extended or adjusted under 35 U.S.C. 154(b) by 836 days.

(21) Appl. No.: 17/787,183

(22) PCT Filed: Dec. 17, 2020

(86) PCT No.: PCT/EP2020/086812
§ 371 (c)(1),
(2) Date: Jun. 17, 2022

(87) PCT Pub. No.: WO2021/123014
PCT Pub. Date: Jun. 24, 2021

(65) Prior Publication Data
US 2023/0013410 A1   Jan. 19, 2023

(30) Foreign Application Priority Data
Dec. 19, 2019   (GB) ...................................... 1918856

(51) Int. Cl.
*A61B 5/00*   (2006.01)
*A61B 5/053*   (2021.01)
(Continued)

(52) U.S. Cl.
CPC ............ *A61B 5/6832* (2013.01); *A61B 5/053* (2013.01); *A61B 5/445* (2013.01); *A61F 13/0276* (2013.01); *A61F 13/05* (2024.01)

(58) Field of Classification Search
CPC ................ A61M 1/95; A61M 2207/00; A61M 2205/0238; A61F 13/01017; A61F 13/00051; A61F 13/00991; A61F 13/0206
(Continued)

(56) References Cited

U.S. PATENT DOCUMENTS

| 3,896,802 A | 7/1975 | Williams |
| 4,334,530 A | 6/1982 | Hassell |

(Continued)

FOREIGN PATENT DOCUMENTS

| CA | 3059516 A1 * | 10/2018 | ......... A61F 13/0289 |
| CN | 105232229 A | 1/2016 | |

(Continued)

OTHER PUBLICATIONS

Aubakir B., et al., "Vital Sign Monitoring Utilizing Eulerian Video Magnification and Thermography," 38th Annual International Conference of the IEEE Engineering in Medicine and Biology Society, Aug. 16, 2016, pp. 3527-3530 (4 pages).

(Continued)

*Primary Examiner* — Ophelia A Hawthorne
*Assistant Examiner* — Michael Milo
(74) *Attorney, Agent, or Firm* — Knobbe, Martens, Olson & Bear, LLP

(57) ABSTRACT

In some cases, a wound dressing comprises a substantially flexible substrate with a first, wound-facing side supporting a plurality of electronic components and a second side opposite the first side, wherein the substrate comprises a plurality of perforations formed though the substrate and wherein the plurality of perforations comprise walls on the exterior surface of the plurality of perforations, a first substantially stretchable coating applied to the first side of the substrate, and a second substantially stretchable coating applied to second side of the substrate, wherein the walls of (Continued)

the plurality of perforations are at least partially coated with at least one of the coatings.

19 Claims, 19 Drawing Sheets

(51) Int. Cl.
  *A61F 13/02* (2024.01)
  *A61F 13/05* (2024.01)
(58) Field of Classification Search
  USPC .......................................................... 602/46
  See application file for complete search history.

(56) References Cited

U.S. PATENT DOCUMENTS

| | | | |
|---|---|---|---|
| 5,090,410 A | 2/1992 | Saper et al. | |
| 5,253,654 A | 10/1993 | Thomas et al. | |
| 5,635,201 A | 6/1997 | Fabo | |
| 5,642,096 A | 6/1997 | Leyerer et al. | |
| 5,678,448 A | 10/1997 | Fullen et al. | |
| 5,690,610 A | 11/1997 | Ito et al. | |
| 5,836,990 A | 11/1998 | Li | |
| 6,095,992 A | 8/2000 | Augustine | |
| 6,178,342 B1 | 1/2001 | Borgos et al. | |
| 6,381,482 B1 | 4/2002 | Jayaraman et al. | |
| 6,517,484 B1 | 2/2003 | Wilk et al. | |
| 6,551,252 B2 | 4/2003 | Sackner et al. | |
| 6,566,575 B1 * | 5/2003 | Stickels | A61F 13/023 602/41 |
| 6,731,987 B1 | 5/2004 | McAdams et al. | |
| 7,077,832 B2 | 7/2006 | Fleischmann | |
| 7,088,591 B2 | 8/2006 | Kishimoto et al. | |
| 7,201,063 B2 | 4/2007 | Taylor | |
| 7,206,623 B2 | 4/2007 | Blank et al. | |
| 7,289,205 B2 | 10/2007 | Yaroslavsky et al. | |
| 7,316,652 B2 | 1/2008 | Dalgaard et al. | |
| 7,429,255 B2 | 9/2008 | Thompson | |
| 7,520,875 B2 | 4/2009 | Bernabei | |
| 7,521,292 B2 | 4/2009 | Rogers et al. | |
| 7,625,117 B2 | 12/2009 | Haslett et al. | |
| 7,687,678 B2 | 3/2010 | Jacobs | |
| 7,846,141 B2 | 12/2010 | Weston | |
| 7,877,866 B1 | 2/2011 | Greenberg et al. | |
| 7,884,258 B2 | 2/2011 | Boehringer et al. | |
| 7,904,133 B2 | 3/2011 | Gehman et al. | |
| 7,922,676 B2 | 4/2011 | Daskal et al. | |
| 7,942,869 B2 | 5/2011 | Houbolt et al. | |
| 7,945,302 B2 | 5/2011 | McAdams | |
| 8,019,401 B1 | 9/2011 | Smith et al. | |
| 8,032,210 B2 | 10/2011 | Finneran et al. | |
| 8,060,174 B2 | 11/2011 | Simpson et al. | |
| 8,079,247 B2 | 12/2011 | Russell et al. | |
| 8,111,165 B2 | 2/2012 | Ortega et al. | |
| 8,116,841 B2 | 2/2012 | Bly et al. | |
| 8,182,425 B2 | 5/2012 | Stamatas et al. | |
| 8,238,996 B2 | 8/2012 | Burnes et al. | |
| 8,241,231 B2 | 8/2012 | Bausewein et al. | |
| 8,332,053 B1 | 12/2012 | Patterson et al. | |
| 8,333,874 B2 | 12/2012 | Currie | |
| 8,480,641 B2 | 7/2013 | Jacobs | |
| 8,525,340 B2 | 9/2013 | Eckhardt et al. | |
| 8,579,872 B2 | 11/2013 | Coulthard et al. | |
| 8,644,911 B1 | 2/2014 | Panasyuk et al. | |
| 8,663,106 B2 | 3/2014 | Stivoric et al. | |
| 8,682,442 B2 | 3/2014 | McAdams | |
| 8,783,948 B2 | 7/2014 | Panda et al. | |
| 8,788,009 B2 | 7/2014 | Greene et al. | |
| 8,800,386 B2 | 8/2014 | Taylor | |
| 8,818,478 B2 | 8/2014 | Scheffler et al. | |
| 8,848,187 B2 | 9/2014 | Uematsu et al. | |
| 8,894,590 B2 | 11/2014 | Lamoise et al. | |
| 8,925,392 B2 | 1/2015 | Esposito et al. | |
| 8,934,957 B2 | 1/2015 | Dias et al. | |
| 8,934,965 B2 | 1/2015 | Rogers et al. | |
| 8,943,897 B2 | 2/2015 | Beauvais et al. | |
| 8,948,839 B1 | 2/2015 | Longinotti-Buitoni et al. | |
| 8,997,588 B2 | 4/2015 | Taylor | |
| 9,000,251 B2 | 4/2015 | Murphy et al. | |
| 9,042,075 B2 | 5/2015 | Borini et al. | |
| 9,192,531 B2 | 11/2015 | Wu | |
| 9,220,455 B2 | 12/2015 | Sarrafzadeh et al. | |
| 9,282,897 B2 | 3/2016 | Ross, Jr. et al. | |
| 9,314,175 B2 | 4/2016 | Jacofsky et al. | |
| 9,320,473 B2 | 4/2016 | Shuler | |
| 9,372,123 B2 | 6/2016 | Li et al. | |
| 9,378,450 B1 | 6/2016 | Mei et al. | |
| 9,380,698 B1 | 6/2016 | Li et al. | |
| 9,386,947 B2 | 7/2016 | Johnson | |
| 9,393,354 B2 | 7/2016 | Freedman et al. | |
| 9,402,988 B2 | 8/2016 | Buchanan et al. | |
| 9,408,573 B2 | 8/2016 | Welch et al. | |
| 9,427,179 B2 | 8/2016 | Mestrovic et al. | |
| 9,439,599 B2 | 9/2016 | Thompson et al. | |
| 9,483,726 B2 | 11/2016 | Mei et al. | |
| 9,494,474 B2 | 11/2016 | Servati et al. | |
| 9,511,215 B2 | 12/2016 | Skiba | |
| 9,516,758 B2 | 12/2016 | Arora et al. | |
| 9,526,439 B2 | 12/2016 | Connelly et al. | |
| 9,554,484 B2 | 1/2017 | Rogers et al. | |
| 9,572,507 B2 | 2/2017 | Moore et al. | |
| 9,582,072 B2 | 2/2017 | Connor | |
| 9,585,620 B2 | 3/2017 | Paquet et al. | |
| 9,587,991 B2 | 3/2017 | Padiy | |
| 9,592,007 B2 | 3/2017 | Nuovo et al. | |
| 9,603,560 B2 | 3/2017 | Monty et al. | |
| 9,610,388 B2 | 4/2017 | Aceto et al. | |
| 9,613,911 B2 | 4/2017 | Rogers et al. | |
| 9,629,584 B2 | 4/2017 | Macia Barber et al. | |
| 9,675,238 B2 | 6/2017 | Iida et al. | |
| 9,687,195 B2 | 6/2017 | Sims et al. | |
| 9,717,565 B2 | 8/2017 | Blair | |
| 9,844,145 B2 | 12/2017 | Hsu | |
| 9,907,103 B2 | 2/2018 | Chen et al. | |
| 9,999,711 B2 | 6/2018 | Weston et al. | |
| 10,004,643 B2 | 6/2018 | Luckemeyer et al. | |
| 10,046,096 B2 | 8/2018 | Askem et al. | |
| 10,080,524 B1 | 9/2018 | Xi | |
| 10,086,117 B2 | 10/2018 | Locke et al. | |
| 10,117,705 B2 | 11/2018 | Chernov et al. | |
| 10,152,789 B2 | 12/2018 | Carnes et al. | |
| 10,166,387 B2 | 1/2019 | Bergelin et al. | |
| 10,182,740 B2 | 1/2019 | Tonar et al. | |
| 10,182,750 B1 * | 1/2019 | Philippine | A61B 5/6801 |
| 10,201,644 B2 | 2/2019 | Haggstrom et al. | |
| 10,206,604 B2 | 2/2019 | Bergelin et al. | |
| 10,209,213 B2 | 2/2019 | Kang et al. | |
| 10,285,620 B2 | 5/2019 | Jung et al. | |
| 10,288,590 B2 | 5/2019 | Hammond et al. | |
| 10,321,862 B2 | 6/2019 | Dalene et al. | |
| 10,463,773 B2 | 11/2019 | Haggstrom et al. | |
| 10,687,984 B2 | 6/2020 | Rovaniemi | |
| 10,702,153 B2 | 7/2020 | Shamim et al. | |
| 10,716,490 B2 | 7/2020 | Connolly | |
| 10,857,038 B2 | 12/2020 | Zamierowski et al. | |
| 10,940,048 B2 | 3/2021 | Locke | |
| 11,026,847 B2 | 6/2021 | Piotrowski et al. | |
| 11,229,553 B2 | 1/2022 | Chen et al. | |
| 11,647,922 B2 | 5/2023 | Scherer | |
| 11,850,121 B2 | 12/2023 | Rapp | |
| 2002/0016536 A1 | 2/2002 | Benni | |
| 2002/0135752 A1 | 9/2002 | Sokolov et al. | |
| 2003/0033032 A1 | 2/2003 | Lind et al. | |
| 2003/0208148 A1 | 11/2003 | Sullivan | |
| 2003/0210810 A1 | 11/2003 | Gee, Jr. et al. | |
| 2003/0216630 A1 | 11/2003 | Jersey-Willuhn et al. | |
| 2004/0134897 A1 * | 7/2004 | Das | B23K 26/382 219/121.71 |
| 2004/0230132 A1 | 11/2004 | Shehada | |
| 2005/0088832 A1 | 4/2005 | Su et al. | |
| 2005/0240107 A1 | 10/2005 | Alfano et al. | |
| 2005/0280531 A1 | 12/2005 | Fadem et al. | |
| 2006/0058690 A1 | 3/2006 | Bartnik et al. | |

(56) References Cited

U.S. PATENT DOCUMENTS

| | | |
|---|---|---|
| 2006/0181791 A1 | 8/2006 | Van Beek et al. |
| 2006/0234383 A1 | 10/2006 | Gough |
| 2006/0241495 A1 | 10/2006 | Kurtz |
| 2007/0055209 A1 | 3/2007 | Patel et al. |
| 2007/0173892 A1 | 7/2007 | Fleischer et al. |
| 2007/0191754 A1 | 8/2007 | Aali |
| 2007/0260421 A1 | 11/2007 | Berner, Jr. et al. |
| 2007/0293748 A1 | 12/2007 | Engvall et al. |
| 2008/0081973 A1 | 4/2008 | Hoarau |
| 2008/0167535 A1 | 7/2008 | Stivoric et al. |
| 2008/0258717 A1 | 10/2008 | Igney et al. |
| 2008/0287747 A1 | 11/2008 | Mestrovic et al. |
| 2008/0319282 A1 | 12/2008 | Tran |
| 2008/0319283 A1 | 12/2008 | Cotton et al. |
| 2009/0149800 A1 | 6/2009 | Durand |
| 2009/0177051 A1 | 7/2009 | Arons et al. |
| 2009/0177110 A1 | 7/2009 | Lyden et al. |
| 2009/0209830 A1 | 8/2009 | Nagle et al. |
| 2009/0209896 A1 | 8/2009 | Selevan |
| 2009/0234206 A1 | 9/2009 | Gaspard et al. |
| 2009/0245601 A1 | 10/2009 | Cohen et al. |
| 2010/0022990 A1 | 1/2010 | Karpowicz et al. |
| 2010/0025831 A1 | 2/2010 | Yamazaki et al. |
| 2010/0166252 A1 | 7/2010 | Ahmed et al. |
| 2010/0168727 A1 | 7/2010 | Hancock et al. |
| 2010/0268111 A1 | 10/2010 | Drinan et al. |
| 2010/0305473 A1 | 12/2010 | Yuzhakov |
| 2011/0004088 A1 | 1/2011 | Grossman |
| 2011/0015591 A1 | 1/2011 | Hanson et al. |
| 2011/0054283 A1 | 3/2011 | Shuler |
| 2011/0130697 A1 | 6/2011 | Nagle et al. |
| 2011/0140703 A1 | 6/2011 | Chiao et al. |
| 2011/0190639 A1 | 8/2011 | Peltie et al. |
| 2011/0218757 A1 | 9/2011 | Callsen et al. |
| 2011/0242532 A1 | 10/2011 | McKenna |
| 2011/0245682 A1 | 10/2011 | Robinson et al. |
| 2011/0301441 A1 | 12/2011 | Bandic et al. |
| 2012/0029306 A1 | 2/2012 | Paquet et al. |
| 2012/0029307 A1 | 2/2012 | Paquet et al. |
| 2012/0029410 A1 | 2/2012 | Koenig et al. |
| 2012/0165717 A1 | 6/2012 | Al Khaburi |
| 2012/0190989 A1 | 7/2012 | Kaiser et al. |
| 2012/0265120 A1 | 10/2012 | Beisang, III et al. |
| 2012/0271265 A1 | 10/2012 | Langdon |
| 2012/0277559 A1 | 11/2012 | Kohl-Bareis et al. |
| 2012/0316538 A1 | 12/2012 | Heiser et al. |
| 2012/0330252 A1 | 12/2012 | Stokes et al. |
| 2013/0041235 A1 | 2/2013 | Rogers et al. |
| 2013/0064772 A1 | 3/2013 | Swiss et al. |
| 2013/0121544 A1 | 5/2013 | Sarrafzadeh et al. |
| 2013/0123722 A1 | 5/2013 | Pratt et al. |
| 2013/0151223 A1 | 6/2013 | Zamierowski et al. |
| 2013/0200268 A1 | 8/2013 | Rafferty et al. |
| 2013/0261409 A1 | 10/2013 | Pathak et al. |
| 2013/0271278 A1 | 10/2013 | Duesterhoft et al. |
| 2013/0274563 A1 | 10/2013 | Duesterhoft et al. |
| 2013/0274629 A1 | 10/2013 | Duesterhoft et al. |
| 2013/0317367 A1 | 11/2013 | Shuler |
| 2014/0012108 A1 | 1/2014 | McPeak |
| 2014/0018637 A1 | 1/2014 | Bennett et al. |
| 2014/0024905 A1 | 1/2014 | Sarrafzadeh et al. |
| 2014/0031663 A1 | 1/2014 | Gallego et al. |
| 2014/0072190 A1 | 3/2014 | Wu et al. |
| 2014/0075658 A1 | 3/2014 | McGuin |
| 2014/0107495 A1 | 4/2014 | Marinelli et al. |
| 2014/0107498 A1 | 4/2014 | Bower et al. |
| 2014/0147611 A1 | 5/2014 | Ackerman, Jr. |
| 2014/0203797 A1 | 7/2014 | Stivoric et al. |
| 2014/0206947 A1 | 7/2014 | Isserow et al. |
| 2014/0228788 A1* | 8/2014 | Croizat ............... A61F 13/05 604/319 |
| 2014/0232516 A1 | 8/2014 | Stivoric et al. |
| 2014/0235166 A1 | 8/2014 | Molettiere et al. |
| 2014/0243709 A1 | 8/2014 | Gibson et al. |
| 2014/0296749 A1 | 10/2014 | Reid, Jr. et al. |
| 2014/0298927 A1 | 10/2014 | Allin et al. |
| 2014/0298928 A1 | 10/2014 | Duesterhoft et al. |
| 2014/0303463 A1 | 10/2014 | Robinson et al. |
| 2014/0324120 A1 | 10/2014 | Bogie et al. |
| 2014/0340857 A1 | 11/2014 | Hsu et al. |
| 2014/0343478 A1 | 11/2014 | Brennan et al. |
| 2014/0350882 A1 | 11/2014 | Everett et al. |
| 2015/0018792 A1 | 1/2015 | Marsiquet et al. |
| 2015/0025343 A1 | 1/2015 | Gareau et al. |
| 2015/0138330 A1 | 5/2015 | Krishnamoorthi |
| 2015/0141767 A1 | 5/2015 | Rogers et al. |
| 2015/0148760 A1 | 5/2015 | Dodd et al. |
| 2015/0150479 A1 | 6/2015 | Yoshino et al. |
| 2015/0182166 A1 | 7/2015 | Evans et al. |
| 2015/0223716 A1 | 8/2015 | Korkala et al. |
| 2015/0257644 A1 | 9/2015 | Cao |
| 2015/0265191 A1 | 9/2015 | Harding et al. |
| 2015/0292968 A1 | 10/2015 | Vogt et al. |
| 2015/0313476 A1 | 11/2015 | Pisani et al. |
| 2015/0313533 A1 | 11/2015 | Rapp et al. |
| 2015/0327777 A1 | 11/2015 | Kostic et al. |
| 2015/0335254 A1 | 11/2015 | Fastert et al. |
| 2015/0335287 A1 | 11/2015 | Neuman et al. |
| 2015/0335288 A1 | 11/2015 | Toth et al. |
| 2015/0351970 A1 | 12/2015 | Dagger et al. |
| 2015/0359485 A1 | 12/2015 | Berg et al. |
| 2015/0374309 A1 | 12/2015 | Farkas et al. |
| 2016/0015962 A1 | 1/2016 | Shokoueinejad Maragheh et al. |
| 2016/0022223 A1 | 1/2016 | Grundfest et al. |
| 2016/0029900 A1 | 2/2016 | LaPlante et al. |
| 2016/0030132 A1 | 2/2016 | Cheung et al. |
| 2016/0038045 A1 | 2/2016 | Shapiro |
| 2016/0038083 A1 | 2/2016 | Ding et al. |
| 2016/0051147 A1 | 2/2016 | Cohen et al. |
| 2016/0058380 A1 | 3/2016 | Lee et al. |
| 2016/0066854 A1 | 3/2016 | Mei et al. |
| 2016/0069743 A1 | 3/2016 | McQuilkin et al. |
| 2016/0074234 A1 | 3/2016 | Abichandani et al. |
| 2016/0081601 A1 | 3/2016 | Ballam et al. |
| 2016/0100790 A1 | 4/2016 | Cantu et al. |
| 2016/0100987 A1 | 4/2016 | Hartwell et al. |
| 2016/0129469 A1 | 5/2016 | Kulinsky et al. |
| 2016/0143534 A1 | 5/2016 | Hyde et al. |
| 2016/0144084 A1* | 5/2016 | Collinson ............... A61F 13/05 604/319 |
| 2016/0157779 A1 | 6/2016 | Baxi et al. |
| 2016/0213269 A1 | 7/2016 | Lam et al. |
| 2016/0228049 A1 | 8/2016 | Nackaerts et al. |
| 2016/0232807 A1 | 8/2016 | Ghaffari et al. |
| 2016/0242331 A1 | 8/2016 | Park et al. |
| 2016/0249810 A1 | 9/2016 | Darty et al. |
| 2016/0262672 A1 | 9/2016 | Hammond et al. |
| 2016/0262687 A1 | 9/2016 | Vaidyanathan et al. |
| 2016/0270700 A1 | 9/2016 | Baxi |
| 2016/0287177 A1 | 10/2016 | Huppert et al. |
| 2016/0302729 A1 | 10/2016 | Starr et al. |
| 2016/0310023 A1 | 10/2016 | Chachisvilis et al. |
| 2016/0317057 A1 | 11/2016 | Li et al. |
| 2016/0331263 A1 | 11/2016 | Cailler et al. |
| 2016/0331322 A1 | 11/2016 | Son et al. |
| 2016/0338591 A1 | 11/2016 | Lachenbruch et al. |
| 2016/0354001 A1 | 12/2016 | Buckley et al. |
| 2016/0367189 A1 | 12/2016 | Aimone et al. |
| 2016/0367192 A1 | 12/2016 | Iyengar et al. |
| 2016/0367406 A1 | 12/2016 | Barnett |
| 2017/0000407 A1 | 1/2017 | Saxby et al. |
| 2017/0007853 A1 | 1/2017 | Alford et al. |
| 2017/0027498 A1 | 2/2017 | Larson et al. |
| 2017/0079740 A1 | 3/2017 | Hufnagel et al. |
| 2017/0086519 A1 | 3/2017 | Vigano' et al. |
| 2017/0086709 A1 | 3/2017 | Khine et al. |
| 2017/0095208 A1 | 4/2017 | Oberleitner et al. |
| 2017/0146474 A1 | 5/2017 | Bedell et al. |
| 2017/0156594 A1 | 6/2017 | Stivoric et al. |
| 2017/0156621 A1 | 6/2017 | Bettinger et al. |
| 2017/0156658 A1 | 6/2017 | Maharbiz et al. |
| 2017/0164865 A1 | 6/2017 | Rafferty et al. |
| 2017/0164876 A1 | 6/2017 | Hyde et al. |
| 2017/0172439 A1 | 6/2017 | Zhu et al. |

(56) References Cited

U.S. PATENT DOCUMENTS

| | | |
|---|---|---|
| 2017/0202711 A1 | 7/2017 | Cernasov et al. |
| 2017/0224271 A1 | 8/2017 | Lachenbruch et al. |
| 2017/0231015 A1 | 8/2017 | Jang et al. |
| 2017/0258972 A1 | 9/2017 | Weston |
| 2017/0319075 A1 | 11/2017 | Homan et al. |
| 2017/0326004 A1 | 11/2017 | Long et al. |
| 2017/0367644 A1 | 12/2017 | Sharman et al. |
| 2018/0003579 A1 | 1/2018 | Esposito et al. |
| 2018/0008177 A1 | 1/2018 | Shimuta et al. |
| 2018/0055697 A1 | 3/2018 | Mihali et al. |
| 2018/0056087 A1 | 3/2018 | Ribeiro et al. |
| 2018/0064843 A1* | 3/2018 | Von Wolff ........ A61F 13/00063 |
| 2018/0070880 A1 | 3/2018 | Trembly et al. |
| 2018/0074547 A1 | 3/2018 | Smadi et al. |
| 2018/0116877 A1 | 5/2018 | Ineichen |
| 2018/0132287 A1 | 5/2018 | Cheng et al. |
| 2018/0192514 A1 | 7/2018 | Seo |
| 2018/0200414 A1 | 7/2018 | Askem et al. |
| 2018/0206758 A1 | 7/2018 | Feldkamp et al. |
| 2018/0235484 A1 | 8/2018 | Mozdzierz |
| 2018/0296397 A1 | 10/2018 | Askem et al. |
| 2019/0021911 A1 | 1/2019 | Askem et al. |
| 2019/0060126 A1 | 2/2019 | Ribble et al. |
| 2019/0076298 A1 | 3/2019 | Quintanar et al. |
| 2019/0083025 A1 | 3/2019 | Aung et al. |
| 2019/0117465 A1* | 4/2019 | Osborne ................ A61F 13/05 |
| 2019/0133812 A1 | 5/2019 | Seres et al. |
| 2019/0134280 A1 | 5/2019 | Toth |
| 2019/0159938 A1 | 5/2019 | Askem et al. |
| 2019/0175098 A1 | 6/2019 | Burns |
| 2019/0192066 A1 | 6/2019 | Schoess et al. |
| 2019/0231939 A1 | 8/2019 | Askem et al. |
| 2019/0269563 A1* | 9/2019 | Yamashita .............. A61F 13/15 |
| 2019/0290496 A1 | 9/2019 | Brownhill et al. |
| 2019/0374387 A1 | 12/2019 | Ribble et al. |
| 2020/0054218 A1 | 2/2020 | Xi |
| 2020/0078482 A1 | 3/2020 | Yoon et al. |
| 2020/0078499 A1 | 3/2020 | Gadde et al. |
| 2020/0100711 A1 | 4/2020 | Choudhury et al. |
| 2020/0147407 A1 | 5/2020 | Efremkin |
| 2020/0281512 A1 | 9/2020 | Grubb et al. |
| 2020/0281513 A1 | 9/2020 | Grubb et al. |
| 2020/0281529 A1 | 9/2020 | Grubb et al. |
| 2020/0289346 A1 | 9/2020 | Hansen et al. |
| 2020/0330258 A1 | 10/2020 | Hansen et al. |
| 2020/0360547 A1 | 11/2020 | Smith et al. |
| 2021/0128364 A1* | 5/2021 | Cole ................ A61F 13/00055 |
| 2021/0137446 A1 | 5/2021 | Brownhill et al. |
| 2021/0145359 A1 | 5/2021 | Hunt et al. |
| 2021/0212855 A1 | 7/2021 | Hansen et al. |
| 2022/0079509 A1 | 3/2022 | Gellman et al. |

FOREIGN PATENT DOCUMENTS

| | | | |
|---|---|---|---|
| CN | 105395184 A | 3/2016 | |
| CN | 106102322 A | 11/2016 | |
| CN | 109350362 A | 2/2019 | |
| DE | 19632273 A1 * | 2/1998 | ............ G06F 3/014 |
| DE | 102012211015 A1 | 1/2014 | |
| DE | 102013013013 A1 | 2/2015 | |
| EP | 2454990 A2 | 5/2012 | |
| EP | 2532305 A1 * | 12/2012 | ......... A61B 5/14532 |
| EP | 2565630 A1 | 3/2013 | |
| EP | 3231478 A1 | 10/2017 | |
| EP | 3409190 A1 | 12/2018 | |
| EP | 3499510 A1 | 6/2019 | |
| EP | 3837520 A1 | 6/2021 | |
| EP | 4157178 A1 | 4/2023 | |
| GB | 2316171 A | 2/1998 | |
| GB | 2563602 A | 12/2018 | |
| JP | 2009225863 A | 10/2009 | |
| KR | 20120119523 A | 10/2012 | |
| KR | 101224629 B1 | 1/2013 | |
| KR | 20140024743 A | 3/2014 | |
| KR | 20140058041 A | 5/2014 | |
| KR | 20160071044 A | 6/2016 | |
| KR | 20190105898 A | 9/2019 | |
| NL | 1027236 C2 | 4/2006 | |
| WO | WO-9832790 A1 * | 7/1998 | ............ B01J 20/287 |
| WO | WO-0021433 A1 | 4/2000 | |
| WO | WO-0043046 A2 | 7/2000 | |
| WO | WO-03067229 A1 | 8/2003 | |
| WO | WO-2006041997 A2 | 4/2006 | |
| WO | WO-2007030379 A2 | 3/2007 | |
| WO | WO-2008006150 A1 | 1/2008 | |
| WO | WO-2008010604 A1 | 1/2008 | |
| WO | WO-2009052607 A1 | 4/2009 | |
| WO | WO-2009120951 A2 | 10/2009 | |
| WO | WO-2009141777 A1 | 11/2009 | |
| WO | WO-2010020919 A1 | 2/2010 | |
| WO | WO-2010105053 A2 | 9/2010 | |
| WO | WO-2011082420 A1 | 7/2011 | |
| WO | WO-2011113070 A1 | 9/2011 | |
| WO | WO-2011123848 A1 | 10/2011 | |
| WO | WO-2012141999 A1 | 10/2012 | |
| WO | WO-2013026999 A1 | 2/2013 | |
| WO | WO-2013044226 A2 | 3/2013 | |
| WO | WO-2013155193 A1 | 10/2013 | |
| WO | WO-2014036577 A1 | 3/2014 | |
| WO | WO-2014116816 A1 | 7/2014 | |
| WO | WO-2015112095 A1 | 7/2015 | |
| WO | WO-2015168720 A1 | 11/2015 | |
| WO | WO-2016025438 A1 | 2/2016 | |
| WO | WO-2016030752 A1 | 3/2016 | |
| WO | WO-2016058032 A1 | 4/2016 | |
| WO | WO-2016073777 A1 | 5/2016 | |
| WO | WO-2016100218 A1 | 6/2016 | |
| WO | WO-2016110564 A1 | 7/2016 | |
| WO | WO-2016187136 A1 | 11/2016 | |
| WO | WO-2016205872 A1 | 12/2016 | |
| WO | WO-2016205881 A1 | 12/2016 | |
| WO | WO-2017021006 A1 | 2/2017 | |
| WO | WO-2017021965 A2 | 2/2017 | |
| WO | WO-2017033058 A1 | 3/2017 | |
| WO | WO-2017037479 A1 | 3/2017 | |
| WO | WO-2017041014 A1 | 3/2017 | |
| WO | WO-2017041385 A1 | 3/2017 | |
| WO | WO-2017041386 A1 | 3/2017 | |
| WO | WO-2017041387 A1 | 3/2017 | |
| WO | WO-2017119996 A1 | 7/2017 | |
| WO | WO-2017195038 A1 * | 11/2017 | ............ A61B 5/445 |
| WO | WO-2017205728 A1 | 11/2017 | |
| WO | WO-2017214188 A1 | 12/2017 | |
| WO | WO-2018035612 A1 | 3/2018 | |
| WO | WO-2018060417 A1 | 4/2018 | |
| WO | WO-2018064569 A1 | 4/2018 | |
| WO | WO-2018115461 A1 | 6/2018 | |
| WO | WO-2018144938 A1 | 8/2018 | |
| WO | WO-2018144941 A1 | 8/2018 | |
| WO | WO-2018144943 A1 | 8/2018 | |
| WO | WO-2018144946 A1 | 8/2018 | |
| WO | WO-2018185138 A1 | 10/2018 | |
| WO | WO-2018189265 A1 | 10/2018 | |
| WO | WO-2018209090 A1 | 11/2018 | |
| WO | WO-2018211458 A1 | 11/2018 | |
| WO | WO-2018234443 A1 | 12/2018 | |
| WO | WO-2019020550 A1 | 1/2019 | |
| WO | WO-2019020551 A1 | 1/2019 | |
| WO | WO-2019020666 A1 | 1/2019 | |
| WO | WO-2019030384 A2 | 2/2019 | |
| WO | WO-2019048624 A1 | 3/2019 | |
| WO | WO-2019048626 A1 | 3/2019 | |
| WO | WO-2019048638 A1 | 3/2019 | |
| WO | WO-2019063481 A1 | 4/2019 | |
| WO | WO-2019063488 A2 | 4/2019 | |
| WO | WO-2019067264 A1 | 4/2019 | |
| WO | WO-2019072531 A1 | 4/2019 | |
| WO | WO-2019076967 A2 | 4/2019 | |
| WO | WO-2019096828 A1 | 5/2019 | |
| WO | WO-2019140441 A2 | 7/2019 | |
| WO | WO-2019140444 A1 | 7/2019 | |
| WO | WO-2019140448 A1 | 7/2019 | |
| WO | WO-2019140449 A1 | 7/2019 | |
| WO | WO-2019193141 A1 | 10/2019 | |

(56) References Cited

FOREIGN PATENT DOCUMENTS

| WO | WO-2019216883 A1 | 11/2019 |
| --- | --- | --- |
| WO | WO-2019230183 A1 | 12/2019 |
| WO | WO-2019238180 A1 | 12/2019 |
| WO | WO-2019238181 A1 | 12/2019 |
| WO | WO-2019238182 A1 | 12/2019 |
| WO | WO-2019238195 A1 | 12/2019 |
| WO | WO-2019238196 A1 | 12/2019 |
| WO | WO-2019238197 A1 | 12/2019 |
| WO | WO-2019238198 A1 | 12/2019 |
| WO | WO-2020002416 A1 | 1/2020 |
| WO | WO-2020043806 A1 | 3/2020 |
| WO | WO-2020139541 A1 | 7/2020 |
| WO | WO-2020157103 A1 | 8/2020 |
| WO | WO-2020159677 A1 | 8/2020 |
| WO | WO-2020167547 A1 | 8/2020 |
| WO | WO-2020242876 A1 | 12/2020 |
| WO | WO-2021059209 A1 | 4/2021 |
| WO | WO-2021250494 A1 | 12/2021 |

OTHER PUBLICATIONS

Bandodkar A.J., et al., "Battery-Free, Skin-Interfaced Microfluidic/Electronic Systems for Simultaneous Electrochemical, Colorimetric and Volumetric Analysis of Sweat," Science Advances, vol. 5 (1), Jan. 18, 2019, retrieved from http://advances.sciencemag.org/content/5/1/eaav3294, 16 pages.

Cauwe M., et al., "Technology Development for a Low-Cost, Roll-to-Roll Chip Embedding Solution Based on PET Foils," 18th European Microelectronics and Packaging Conference (EMPC), IEEE, Sep. 12, 2011, 6 pages.

Farooqui M.F., et al., "Low Cost Inkjet Printed Smart Bandage for Wireless Monitoring of Chronic Wounds," Scientific Reports, vol. 6, Jun. 29, 2016, 14 pages.

Geng Y., et al., "A Hybrid Low Power Biopatch for Body Surface Potential Measurement," IEEE Journal of Biomedical and Health Informatics, vol. 17, No. 3, May 1, 2013, pp. 591-599.

George J., et al., "Reliability of Plastic-Encapsulated Electronic Components in Supersaturated Steam Environments," IEEE Transactions on Components, Packaging and Manufacturing Technology, vol. 5 (10), Oct. 2015, pp. 1423-1431.

Ianneta Jr. R.A., et al., "Successful Case Histories of Polymer Based Circuitry on Flexible Film Substrates," Electro/94 International Conference Proceedings Combined vols. IEEE, XP010149465, May 10-12, 1994, pp. 885-889.

International Search Report and Written Opinion for Application No. PCT/EP2020/086812, mailed on Apr. 23, 2021, 14 pages.

Little Miss Plasters, kidstravelclub.co.uk., retrieved from http://www.kidstravelclub.co.uk/little-miss-girls-childrens-plasters on Aug. 26, 2016, 2 pages.

Lu B., et al., "A Study of the Autofluorescence of Parylene Materials for μTAS Applications," Lab on Chip, vol. 10 (14), Jul. 2010, pp. 1826-1834.

McLeod A.J., et al., "Motion Magnification for Endoscopic Surgery," Progress in Biomedical Optics and Imaging, SPIE—International Society for Optical Engineering, Mar. 12, 2014, vol. 9036, 8 pages.

Mehmood N., et al., "Applications Of Modern Sensors And Wireless Technology In Effective Wound Management: Modern Sensors And Wireless Technology," Journal of Biomedical Materials Research Part B, vol. 102, May 1, 2014, XP055739544, pp. 885-895.

Mostafalu P., et al., "Wireless Flexible Smart Bandage For Continuous Monitoring Of Wound Oxygenation," IEEE Transactions on Biomedical Circuits and Systems, vol. 9 (5), Oct. 1, 2015, XP055526132, pp. 670-677 (8 pages).

Narusawa H., "The Corona Discharge Causes Short Destruction that had Bad Influence on a Power Switching Circuit," Adphox Corporation, Jan. 1, 2009, retrieved from http://www.adphox.co.jp/keisokuki/ke-english-corona/CORONA_DISCHARGE_EN.pdf, 12 pages.

Pang Q., et al., "Smart Flexible Electronics-Integrated Wound Dressing for Real-Time Monitoring and On-Demand Treatment of Infected Wounds," Advanced Science, vol. 7, No. 6, Mar. 2020, 1902673, XP055739532, 10 pages.

Raviglione A., et al., "Real-Time Smart Textile-Based System to Monitor Pressure Offloading of Diabetic Foot Ulcers," Journal of Diabetes Science and Technology, vol. 11 (5), Sep. 2017, pp. 894-898.

Rose D.P., et al., "Adhesive RFID Sensor Patch for Monitoring of Sweat Electrolytes," IEEE Transactions on Biomedical Engineering, vol. 62 (6), Jun. 2015, first published on Nov. 11, 2015, pp. 1457-1465.

Simoska O., et al., "Electrochemical Detection of Multianalyte Biomarkers in Wound Healing Efficacy," ACS Sensors, Nov. 11, 2020, pp. 3547-3557.

"'Smart' Wearable Sensor Developed to Track Healing," retrieved from https://web.archive.org/web/20201203160955/https://www.theengineer.co.uk/smart-wearable-sensor-developed-to-track-healing/, Dec. 3, 2020, 2 pages.

Wakita J., et al., "Variations in Optical Absorption and Fluorescence Spectra for Polyimide Thin Films Caused by Structural Isomerism," Journal of Photopolymer Science and Technology, Jan. 1, 2003, 1 page.

Willis B., "Conformal Coating Inspection & Coating Faults," Vision Engineering, Jul. 21, 2016, retrieved from http://www.visioneng.com/wp-content/uploads/2017/11/Conformal-Coating-Inspection-and-Defects.21JUL16.pdf, 35 pages.

Willis B., "Guide to Conformal Coating & Cleaning Defects Contents," Mar. 1, 2014, retrieved from http://coatingguide.smartgroup.org/Files%20pdf/Coating%20Defects%20V2%2014March2014.pdf, vol. 1, 31 pages.

International Preliminary Report on Patentability and Written Opinion for Application No. PCT/EP2020/086812, mailed on Jun. 30, 2022, 8 pages.

* cited by examiner

100B

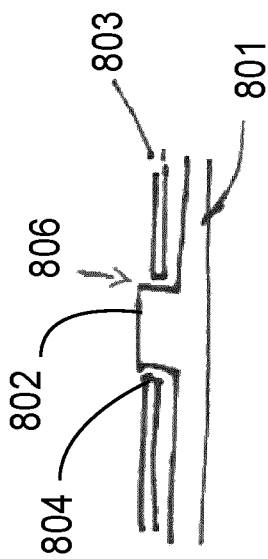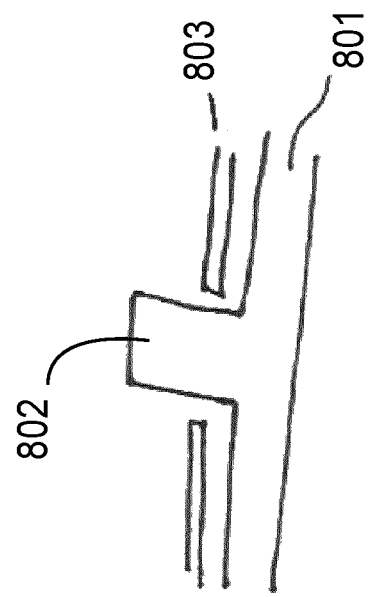

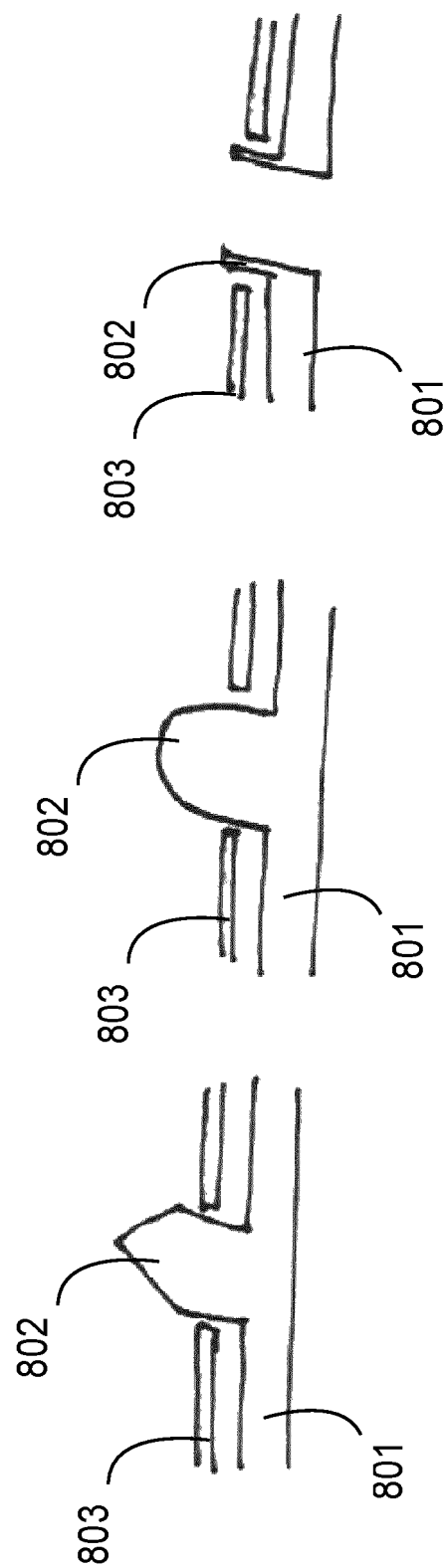

SENSOR INTEGRATED DRESSINGS AND SYSTEMS

CROSS-REFERENCE TO RELATED APPLICATIONS

This application is a U.S. national stage application of International Patent Application No. PCT/EP2020/086812, filed Dec. 17, 2020, which claims priority to U.K. Patent Application No. 1918856.4, filed on Dec. 19, 2019, the disclosure of each of which is hereby incorporated by reference in its entirety.

FIELD

Embodiments of the present disclosure relate to apparatuses, systems, and methods for the monitoring and/or treatment of tissue with sensor integrated or sensor-enabled dressings.

DESCRIPTION OF THE RELATED ART

Nearly all areas of medicine may benefit from improved information regarding the state of the tissue, organ, or system to be treated, particularly if such information is gathered in real-time during treatment, many types of treatments are still routinely performed without the use of sensor data collection. Instead, such treatments rely upon visual inspection by a caregiver or other limited means rather than quantitative sensor data. For example, in the case of wound treatment via dressings and/or negative pressure wound therapy, data collection is generally limited to visual inspection by a caregiver and often the underlying wounded tissue may be obscured by bandages or other visual impediments. Even intact, unwounded skin may have underlying damage that is not visible to the naked eye, such as a compromised vascular or deeper tissue damage that may lead to an ulcer. Similar to wound treatment, during orthopedic treatments requiring the immobilization of a limb with a cast or other encasement, only limited information is gathered on the underlying tissue. In instances of internal tissue repair, such as a bone plate, continued direct sensor-driven data collection is not performed. Further, braces and/or sleeves used to support musculoskeletal function do not monitor the functions of the underlying muscles or the movement of the limbs. Outside of direct treatments, common hospital room items such as beds and blankets could be improved by adding capability to monitor patient parameters.

Therefore, there is a need for improved sensor monitoring, particularly through the use of sensor integrated substrates which can be incorporated into existing treatment regimes.

SUMMARY

In some cases, a wound dressing can comprise a substantially flexible substrate with a first, wound-facing side supporting a plurality of electronic components and a second side opposite the first side, wherein the substrate comprises a plurality of perforations formed though the substrate, and wherein the plurality of perforations comprise walls on an exterior surface of the plurality of perforations, a first substantially stretchable coating applied to the first side of the substrate, and a second substantially stretchable coating applied to second side of the substrate, wherein the walls of the plurality of perforations are at least partially coated with at least one of the coatings.

The wound dressing of any preceding paragraphs and/or any of the wound dressings disclosed herein can include one or more of the following features. The walls of the plurality of perforations can be at least partially uniformly coated. The plurality of perforations can be greater than or equal to 0.25 mm in diameter. The walls of the plurality of perforations can comprise a plurality of grooves. The walls of the plurality of perforations can be at least partially non-uniformly coated. The dressing can further comprise a protective layer applied to the second side of the substrate, the protective layer can be configured to be removed to expose the substrate. The protective layer can comprise first and second portions separated by a slit, the first portion extending over the second portion to cover the slit. The plurality of electronic components can comprise a plurality of sensors configured to obtain measurements of the wound, at least some of the plurality of sensors interconnected by a plurality of electronic connections. The first stretchable coating can cover substantially an entire area of the first side of the substrate. The second stretchable coating can cover substantially an entire area of the second side of the substrate. The first substantially stretchable coating and the second stretchable coating can comprise the same material. The walls of the plurality of perforations can be at least partially coated with the second stretchable coating. The dressing can further comprise a first substantially non-stretchable coating applied to at least some of the plurality of electronic components. The first substantially non-stretchable coating can be applied to at least some of the plurality of electronic components, the first stretchable coating applied over the substantially non-stretchable coating. The exterior wall of a perforation of the plurality of perforations can comprise a first diameter and the perforation of the plurality of perforations comprises a second diameter formed after at least one of the coatings is applied to the exterior wall, wherein the second diameter is within the first diameter and smaller than the first diameter.

In some cases, a kit can include the dressing of any of the preceding paragraphs or any of the dressings disclosed herein and a negative pressure wound therapy device configured to supply negative pressure to the wound covered by the dressing.

The kit of any preceding paragraph and/or any of the kits disclosed herein can include one or more of the following features. The dressing and the negative pressure wound therapy device can be sterile. The kit can further comprise a secondary dressing configured to be positioned over the dressing of any of the preceding paragraphs or any of the dressings disclosed herein.

In some cases, a method of manufacturing a wound dressing can comprise coating a first, wound-facing side of a substantially flexible substrate with a first coating, the substrate comprising a second side opposite the first side, the first side of the substrate supporting a plurality of electronic components, wherein the first coating is applied to at least some of the plurality of electronic components; perforating the substrate coated with the first coating to create a plurality of perforations through the substrate coated with the first coating, the plurality of perforations comprising walls and the plurality of perforations configured to facilitate passage of fluid through the substrate; and coating the second side of the substrate with a second coating, the second coating applied to the substrate positioned on a surface comprising a plurality of pins that extend through the plurality of perforations, and the second coating applied at least partially to the walls of the plurality of perforations.

The method of the preceding paragraph and/or any of the methods disclosed herein can include one or more of the following features. The plurality of pins are tapered or dome shaped. The method can further comprise collecting the second coating that flows down the pins in a gutter. Coating the second side of the substrate can comprise applying the second coating uniformly to the walls of the plurality of perforations. The walls of the plurality of perforations can comprise grooves. Coating the second side of the substrate can comprise applying the second coating non-uniformly to the walls of the plurality of perforations. The method can further comprise adhering a protective layer to the substrate, the protective layer can be configured to be removed to expose the substrate. The method can further comprise coating the first side with a third coating applied to at least some of the plurality of electronic components, wherein the second coating is applied over the third coating.

In some cases, a method of manufacturing a wound dressing can comprise coating a first, wound-facing side of a substantially flexible substrate with a first coating, the substrate comprising a second side opposite the first side, the first side of the substrate supporting a plurality of electronic components, wherein the first coating is applied to at least some of the plurality of electronic components, perforating the substrate coated with the first coating to create a first plurality of perforations through the substrate coated with the first coating, the first plurality of perforations comprising walls and having a first diameter, coating the second side of the substrate with a second coating, the second coating applied to fill the plurality of perforations and covering the walls of the plurality of perforations, and perforating the substrate coated with the first coating and second coating to create a second plurality of perforations through the first plurality of perforations of the substrate coated with the first coating and the second coating, the second plurality of perforations comprising a second diameter and the second plurality of perforations is configured to facilitate passage of fluid through the substrate; wherein the second diameter is within the first diameter and is smaller than the first diameter.

BRIEF DESCRIPTION OF THE DRAWINGS

Embodiments of the present disclosure will now be described hereinafter, by way of example only, with reference to the accompanying drawings in which:

FIGS. 8A-8C illustrate embodiments of a substrate positioned on a tool with pins;

FIGS. 8D-8F illustrate embodiments of different shapes of pins that can be used;

DETAILED DESCRIPTION

Figure 1A:
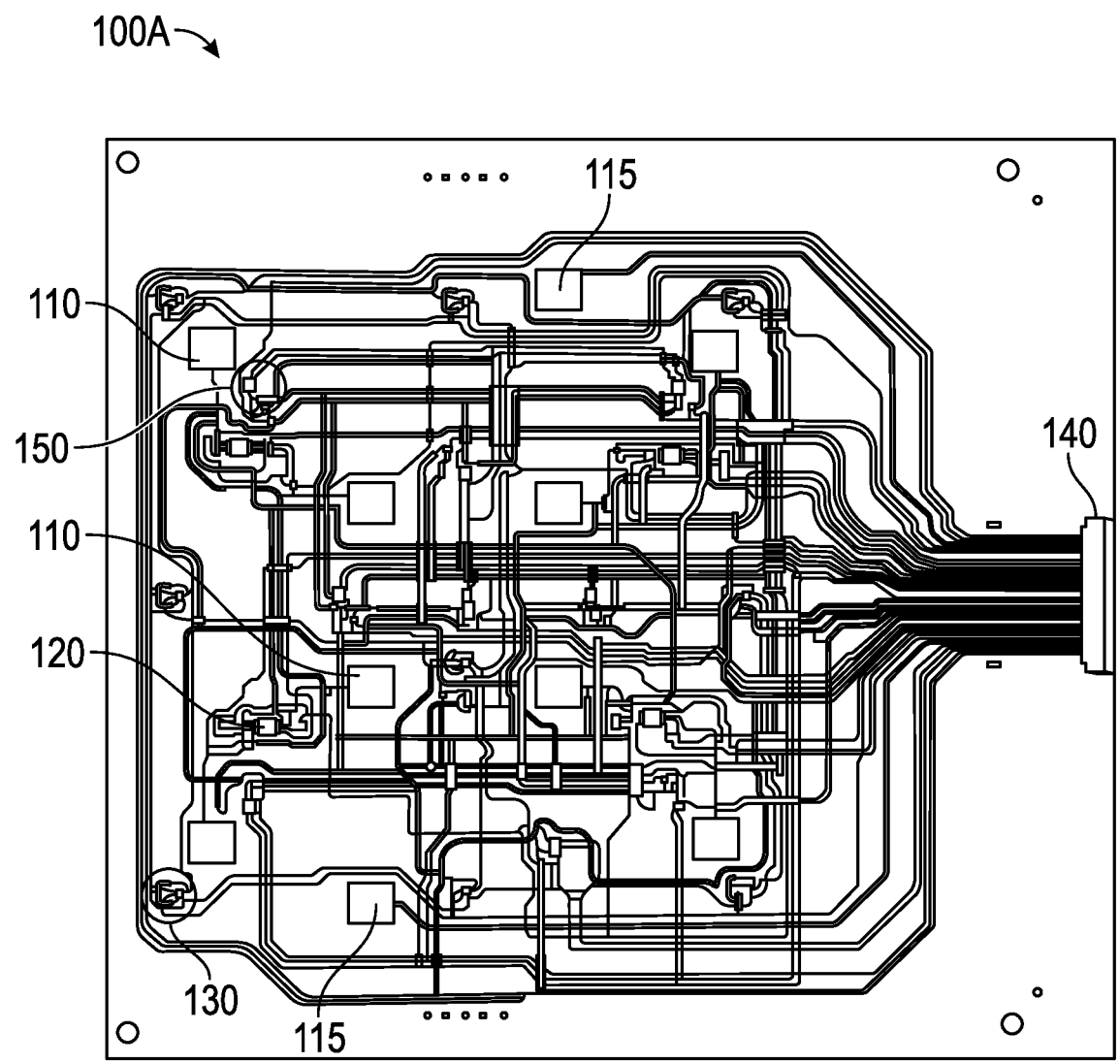
FIG. 1A illustrates a perspective view of a substrate supporting electronic components.

Embodiments disclosed herein relate to apparatuses and methods of at least one of monitoring or treating biological tissue with sensor-enabled substrates. The embodiments disclosed herein are not limited to treatment or monitoring of a particular type of tissue or injury, instead the sensor-enabled technologies disclosed herein are broadly applicable to any type of therapy that may benefit from sensor-enabled substrates. Some implementations utilize sensors and data collection relied upon by health care providers to make both diagnostic and patient management decisions.

Certain embodiments disclosed herein relate to the use of sensors mounted on or embedded within substrates configured to be used in the treatment of both intact and damaged human or animal tissue. Such sensors may collect information about the surrounding tissue and transmit such information to a computing device or a caregiver to be utilized in further treatment. In certain implementations, such sensors may be attached to the skin anywhere on the body, including areas for monitoring arthritis, temperature, or other areas that may be prone to problems and require monitoring. Sensors disclosed herein may also incorporate markers, such as radiopaque markers, to indicate the presence of the device, for example prior to performing an MRI or other technique.

The sensor embodiments disclosed herein may be used in combination with clothing. Non-limiting examples of clothing for use with embodiments of the sensors disclosed herein include shirts, pants, trousers, dresses, undergarments, outer-garments, gloves, shoes, hats, and other suitable garments. In certain embodiments, the sensor embodiments disclosed herein may be welded into or laminated into/onto the particular garments. The sensor embodiments may be printed directly onto the garment and/or embedded into the fabric. Breathable and printable materials such as microporous membranes may also be suitable.

Sensor embodiments disclosed herein may be incorporated into cushioning or bed padding, such as within a hospital bed, to monitor patient characteristics, such as any characteristic disclosed herein. In certain embodiments, a disposable film containing such sensors could be placed over the hospital bedding and removed/replaced as needed.

In some implementations, the sensor embodiments disclosed herein may incorporate energy harvesting, such that the sensor embodiments are self-sustaining. For example, energy may be harvested from thermal energy sources, kinetic energy sources, chemical gradients, or any suitable energy source.

The sensor embodiments disclosed herein may be utilized in rehabilitation devices and treatments, including sports medicine. For example, the sensor embodiments disclosed herein may be used in braces, sleeves, wraps, supports, and other suitable items. Similarly, the sensor embodiments disclosed herein may be incorporated into sporting equipment, such as helmets, sleeves, and/or pads. For example, such sensor embodiments may be incorporated into a protective helmet to monitor characteristics such as acceleration, which may be useful in concussion diagnosis.

The sensor embodiments disclosed herein may be used in coordination with surgical devices, for example, the NAVIO surgical system by Smith & Nephew Inc. In some implementations, the sensor embodiments disclosed herein may be in communication with such surgical devices to guide placement of the surgical devices. In some implementations, the sensor embodiments disclosed herein may monitor blood flow to or away from the potential surgical site or ensure that there is no blood flow to a surgical site. Further surgical data may be collected to aid in the prevention of scarring and monitor areas away from the impacted area.

To further aid in surgical techniques, the sensors disclosed herein may be incorporated into a surgical drape to provide information regarding tissue under the drape that may not be immediately visible to the naked eye. For example, a sensor embedded flexible drape may have sensors positioned advantageously to provide improved area-focused data collection. In certain implementations, the sensor embodiments disclosed herein may be incorporated into the border or interior of a drape to create fencing to limit/control the surgical theater.

Sensor embodiments as disclosed herein may also be utilized for pre-surgical assessment. For example, such sensor embodiments may be used to collect information about a potential surgical site, such as by monitoring skin and the underlying tissues for a possible incision site. For example, perfusion levels or other suitable characteristics may be monitored at the surface of the skin and deeper in the tissue to assess whether an individual patient may be at risk for surgical complications. Sensor embodiments such as those disclosed herein may be used to evaluate the presence of microbial infection and provide an indication for the use of antimicrobials. Further, sensor embodiments disclosed herein may collect further information in deeper tissue, such as identifying pressure ulcer damage and/or the fatty tissue levels.

The sensor embodiments disclosed herein may be utilized in cardiovascular monitoring. For example, such sensor embodiments may be incorporated into a flexible cardiovascular monitor that may be placed against the skin to monitor characteristics of the cardiovascular system and communicate such information to another device and/or a caregiver. For example, such a device may monitor pulse rate, oxygenation of the blood, and/or electrical activity of the heart. Similarly, the sensor embodiments disclosed herein may be utilized for neurophysiological applications, such as monitoring electrical activity of neurons.

The sensor embodiments disclosed herein may be incorporated into implantable devices, such as implantable orthopedic implants, including flexible implants. Such sensor embodiments may be configured to collect information regarding the implant site and transmit this information to an external source. In some cases, an internal source may also provide power for such an implant.

The sensor embodiments disclosed herein may also be utilized for monitoring biochemical activity on the surface of the skin or below the surface of the skin, such as lactose buildup in muscle or sweat production on the surface of the skin. In some cases, other characteristics may be monitored, such as glucose concentration, urine concentration, tissue pressure, skin temperature, skin surface conductivity, skin surface resistivity, skin hydration, skin maceration, and/or skin ripping.

Sensor embodiments as disclosed herein may be incorporated into Ear, Nose, and Throat (ENT) applications. For example, such sensor embodiments may be utilized to monitor recovery from ENT-related surgery, such as wound monitoring within the sinus passage.

Sensor embodiments disclosed herein may encompass sensor printing technology with encapsulation, such as encapsulation with a polymer film. Such a film may be constructed using any polymer described herein, such as polyurethane. Encapsulation of the sensor embodiments may provide waterproofing of the electronics and protection from local tissue, local fluids, and other sources of potential damage.

In certain embodiments, the sensors disclosed herein may be incorporated into an organ protection layer. Such a sensor-embedded organ protection layer may both protect the organ of interest and confirm that the organ protection layer is in position and providing protection. Further, a sensor-embedded organ protection layer may be utilized to monitor the underlying organ, such as by monitoring blood flow, oxygenation, and other suitable markers of organ health. In some cases, a sensor-enabled organ protection layer may be used to monitor a transplanted organ, such as by monitoring the fat and muscle content of the organ. Further, sensor-enabled organ protection layers may be used to monitor an organ during and after transplant, such as during rehabilitation of the organ.

The sensor embodiments disclosed herein may be incorporated into treatments for wounds (disclosed in greater detail below) or in a variety of other applications. Non-limiting examples of additional applications for the sensor embodiments disclosed herein include: monitoring and treatment of intact skin, cardiovascular applications such as monitoring blood flow, orthopedic applications such as monitoring limb movement and bone repair, neurophysiological applications such as monitoring electrical impulses, and any other tissue, organ, system, or condition that may benefit from improved sensor-enabled monitoring.

Wound Therapy

Some systems and methods disclosed herein relate to wound therapy for a human or animal body. Therefore, any reference to a wound herein can refer to a wound on a human or animal body, and any reference to a body herein can refer to a human or animal body. The disclosed technology embodiments may relate to preventing or minimizing damage to physiological tissue or living tissue, or to the treatment of damaged tissue (for example, a wound as described herein) wound with or without reduced pressure, including for example a source of negative pressure and wound dressing components and apparatuses. The apparatuses and components comprising the wound overlay and packing materials or internal layers, if any, are sometimes collectively referred to herein as dressings. In some cases, the wound dressing can be provided to be utilized without reduced pressure.

As used herein the expression "wound" may include an injury to living tissue may be caused by a cut, blow, or other impact, typically one in which the skin is cut or broken. A wound may be a chronic or acute injury. Acute wounds occur as a result of surgery or trauma. They move through the stages of healing within a predicted timeframe. Chronic wounds typically begin as acute wounds. The acute wound can become a chronic wound when it does not follow the healing stages resulting in a lengthened recovery. It is believed that the transition from acute to chronic wound can be due to a patient being immuno-compromised.

Chronic wounds may include for example: venous ulcers (such as those that occur in the legs), which account for the majority of chronic wounds and mostly affect the elderly, diabetic ulcers (for example, foot or ankle ulcers), peripheral arterial disease, pressure ulcers, or epidermolysis bullosa (EB).

Examples of other wounds include, but are not limited to, abdominal wounds or other large or incisional wounds, either as a result of surgery, trauma, sterniotomies, fasciotomies, or other conditions, dehisced wounds, acute wounds, chronic wounds, subacute and dehisced wounds, traumatic wounds, flaps and skin grafts, lacerations, abrasions, contusions, burns, diabetic ulcers, pressure ulcers, stoma, surgical wounds, trauma and venous ulcers or the like.

Wounds may also include a deep tissue injury. Deep tissue injury is a term proposed by the National Pressure Ulcer Advisory Panel (NPUAP) to describe a unique form of pressure ulcers. These ulcers have been described by clinicians for many years with terms such as purple pressure ulcers, ulcers that are likely to deteriorate and bruises on bony prominences.

Wound may also include tissue at risk of becoming a wound as discussed herein. For example, tissue at risk may include tissue over a bony protuberance (at risk of deep tissue injury/insult) or pre-surgical tissue (for example, knee tissue) that may have the potential to be cut (for example, for joint replacement/surgical alteration/reconstruction).

Some systems and methods disclosed herein relate to methods of treating a wound with the technology disclosed herein in conjunction with one or more of the following: advanced footwear, turning a patient, offloading (such as, offloading diabetic foot ulcers), treatment of infection, systemix, antimicrobial, antibiotics, surgery, removal of tissue, affecting blood flow, physiotherapy, exercise, bathing, nutrition, hydration, nerve stimulation, ultrasound, electrostimulation, oxygen therapy, microwave therapy, active agents ozone, antibiotics, antimicrobials, or the like.

Alternatively or additionally, a wound may be treated using topical negative pressure (TNP) and/or traditional advanced wound care, which is not aided by the using of applied negative pressure (may also be referred to as non-negative pressure therapy).

Advanced wound care may include use of an absorbent dressing, an occlusive dressing, use of an antimicrobial and/or debriding agents in a wound dressing or adjunct, a pad (for example, a cushioning or compressive therapy, such as stockings or bandages), or the like.

In some cases, a wound dressing comprises one or more absorbent layer(s). The absorbent layer may be a foam or a superabsorbent.

In some cases, the disclosed technology may be used in conjunction with a non-negative pressure dressing. A non-negative pressure wound dressing suitable for providing protection at a wound site may comprise an absorbent layer for absorbing wound exudate and an obscuring element for at least partially obscuring a view of wound exudate absorbed by the absorbent layer in use. The obscuring element may be partially translucent. The obscuring element may be a masking layer.

In some cases, the non-negative pressure wound dressing as disclosed herein comprises the wound contact layer and the absorbent layer overlies the wound contact layer. The wound contact layer can carry an adhesive portion for forming a substantially fluid tight seal over the wound.

In some cases, the wound dressing as disclosed herein further comprises layer of a superabsorbent fiber, or a viscose fiber or a polyester fiber.

In some cases, the wound dressing as disclosed herein further comprises a backing layer. The backing layer may be a transparent or opaque film. Typically the backing layer comprises a polyurethane film (typically a transparent polyurethane film).

In some cases, the foam may be an open cell foam, or closed cell foam, typically an open cell foam. The foam can be hydrophilic.

The wound dressing may comprise a transmission layer and the layer can be foam. The transmission layer may be a polyurethane foam laminated to a polyurethane film.

The non-negative pressure wound dressing may be a compression bandage. Compression bandages are known for use in the treatment of oedema and other venous and lymphatic disorders, e.g., of the lower limbs. The compression bandage in some cases may comprise a bandage system comprising an inner skin facing layer and an elastic outer layer, the inner layer comprising a first ply of foam and a second ply of an absorbent nonwoven web, the inner layer and outer layer being sufficiently elongated so as to be capable of being wound about a patient's limb.

Negative Pressure Wound Therapy

In some cases, treatment of wounds can be performed using negative pressure wound therapy. It will be understood that embodiments of the present disclosure are generally applicable to use in TNP systems. Briefly, negative pressure wound therapy assists in the closure and healing of many forms of "hard to heal" wounds by reducing tissue oedema; encouraging blood flow and granular tissue formation; removing excess exudate and may reduce bacterial load (and thus infection risk). In addition, the therapy allows for less disturbance of a wound leading to more rapid healing. TNP therapy systems may also assist on the healing of surgically closed wounds by removing fluid and by helping to stabilize the tissue in the apposed position of closure. A further beneficial use of TNP therapy can be found in grafts and flaps where removal of excess fluid is important and close proximity of the graft to tissue is required in order to ensure tissue viability.

Negative pressure therapy can be used for the treatment of open or chronic wounds that are too large to spontaneously close or otherwise fail to heal by means of applying negative pressure to the site of the wound. Topical negative pressure (TNP) therapy or negative pressure wound therapy (NPWT) involves placing a cover that is impermeable or semi-permeable to fluids over the wound, using various means to seal the cover to the tissue of the patient surrounding the wound, and connecting a source of negative pressure (such as a vacuum pump) to the cover in a manner so that negative pressure is created and maintained under the cover. It is believed that such negative pressures promote wound healing by facilitating the formation of granulation tissue at the wound site and assisting the body's normal inflammatory process while simultaneously removing excess fluid, which may contain adverse cytokines or bacteria.

Some of the dressings used in NPWT can include many different types of materials and layers, for example, gauze, pads, foam pads or multi-layer wound dressings. One example of a multi-layer wound dressing is the PICO dressing, available from Smith & Nephew, includes a wound contact layer and a superabsorbent layer beneath a backing layer to provide a canister-less system for treating a wound with NPWT. The wound dressing may be sealed to a suction port providing connection to a length of tubing, which may be used to pump fluid out of the dressing or to transmit negative pressure from a pump to the wound dressing. Additionally, RENASYS-F, RENASYS-G, RENASYS-AB, and RENASYS-F/AB, available from Smith & Nephew, are additional examples of NPWT wound dressings and systems. Another example of a multi-layer wound dressing is the ALLEVYN Life dressing, available from Smith & Nephew, which includes a moist wound environment dressing that is used to treat the wound without the use of negative pressure.

As is used herein, reduced or negative pressure levels, such as $-X$ mmHg, represent pressure levels relative to normal ambient atmospheric pressure, which can correspond to 760 mmHg (or 1 atm, 29.93 inHg, 101.325 kPa, 14.696 psi, etc.). Accordingly, a negative pressure value of $-X$ mmHg reflects absolute pressure that is X mmHg below 760 mmHg or, in other words, an absolute pressure of (760-X) mmHg. In addition, negative pressure that is "less" or "smaller" than X mmHg corresponds to pressure that is closer to atmospheric pressure (such as, $-40$ mmHg is less than $-60$ mmHg). Negative pressure that is "more" or "greater" than $-X$ mmHg corresponds to pressure that is further from atmospheric pressure (such as, $-80$ mmHg is more than $-60$ mmHg). In some cases, local ambient atmospheric pressure is used as a reference point, and such local atmospheric pressure may not necessarily be, for example, 760 mmHg.

In some cases of wound closure devices described herein, increased wound contraction can lead to increased tissue expansion in the surrounding wound tissue. This effect may be increased by varying the force applied to the tissue, for example by varying the negative pressure applied to the wound over time, possibly in conjunction with increased tensile forces applied to the wound via embodiments of the wound closure devices. In some cases, negative pressure may be varied over time for example using a sinusoidal wave, square wave, or in synchronization with one or more physiological indices (such as, heartbeat).

Any of the embodiments disclosed herein can be used in combination with any of the features disclosed in one or more of WO2010/061225, US2016/114074, US2006/0142560, and U.S. Pat. No. 5,703,225, which describe absorbent materials; WO2013/007973, which describes non-negative pressure wound dressings; GB1618298.2 (filed on 28 Oct. 2016), GB1621057.7 (filed on 12 Dec. 2016), and GB1709987.0 (filed on 22 Jun. 2017), which describe multi-layered wound dressings; EP2498829 and EP1718257, which describe wound dressings; WO2006/110527, U.S. Pat. No. 6,759,566, and US2002/0099318, which describe compression bandages; U.S. Pat. Nos. 8,235,955 and 7,753,894, which describe wound closure devices; WO2013/175306, WO2016/174048, US2015/0190286, US2011/0282309, and US2016/0339158, which describe negative pressure wound therapy dressings, wound dressing components, wound treatment apparatuses, and methods. The disclosure of each of these applications is hereby incorporated by reference in its entirety.

Substrate Supporting Sensors

A wound dressing that incorporates a number of electronic components, including one or more sensors, can be utilized in order to monitor characteristics of a wound. Collecting and analyzing data from a wound can provide useful insights towards determining whether a wound is on a healing trajectory, selecting proper therapy, determining whether the wound has healed, or the like.

Figure 1B:
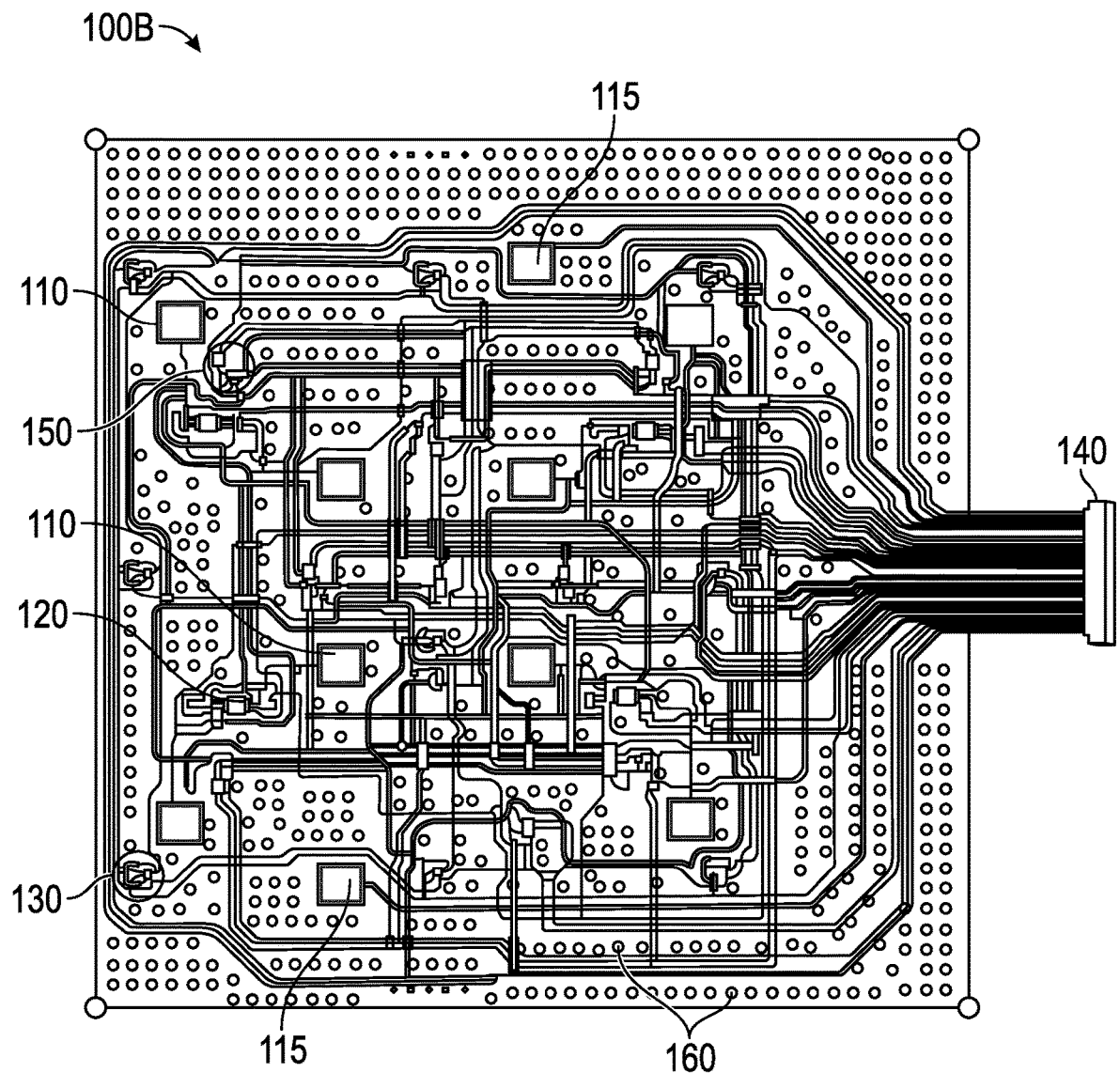
FIGS. 1B-1C illustrate perspective and top views of a perforated substrate supporting electronic components.
Figure 1C:
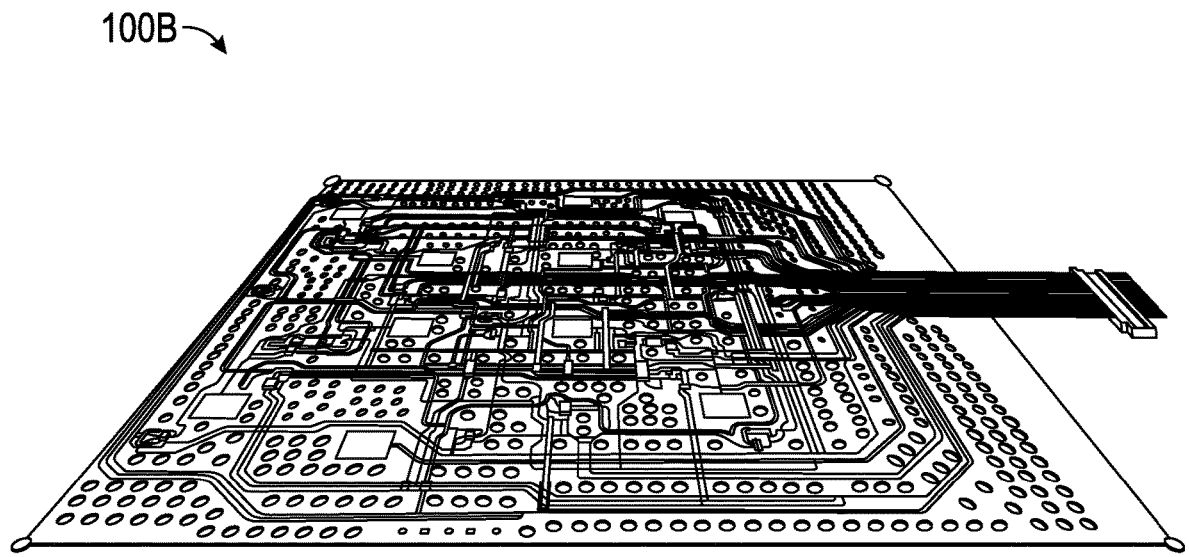

In some implementations, a number of sensor technologies can be used in wound dressings or one or more components forming part of an overall wound dressing apparatus. For example, as illustrated in FIGS. 1A-1C, one or more sensors can be incorporated onto or into a substrate (such substrate can be referred to as "sensor integrated substrate"). The substrate illustrated as having a square shape, but it will be appreciated that the substrate may have other shapes such as rectangular, circular, oval, etc. In some cases, a substrate supporting one or more sensors can be provided as an individual material layer that is placed directly or indirectly over or in a wound. The sensor integrated substrate can be part of a larger wound dressing apparatus. In some cases, the sensor integrated substrate is part of a single unit dressing. Additionally or alternatively, the sensor integrated substrate can be placed directly or indirectly over or in the wound and then covered by a secondary wound dressing, which can include one or more of gauze, foam or other wound packing material, a superabsorbent layer, a drape, a fully integrated dressing like the Pico or Allevyn Life dressing manufactured by Smith & Nephew, or the like.

The sensor integrated substrate can be placed in contact with a wound and can allow fluid to pass through the substrate while causing little to no damage to the tissue in the wound. The substrate can be flexible, elastic, extensible, or stretchable or substantially flexible, elastic, extensible, or stretchable in order to conform to or cover the wound. For example, the substrate can be made from a stretchable or substantially stretchable material, such as one or more of polyurethane, thermoplastic polyurethane (TPU), silicone, polycarbonate, polyethylene, polyimide, polyamide, polyester, polyethelene tetraphthalate (PET), polybutalene tetreaphthalate (PBT), polyethylene naphthalate (PEN), polyetherimide (PEI), along with various fluropolymers (FEP) and copolymers, or another suitable material.

In some cases, the substrate can include one or more flexible circuit boards, which can be formed of flexible polymers, including polyamide, polyimide (PI), polyester, polyethylene naphthalate (PEN), polyetherimide (PEI), along with various fluropolymers (FEP) and copolymers, or the like. One or more sensors can be incorporated into a two-layer flexible circuit. In some scenarios, the one or more circuit boards can be a multi-layer flexible circuit board.

In some cases, the sensor integrated substrate can incorporate adhesive, such as a wound contact layer as described herein, that adheres to wet or dry tissue. In some cases, one or more sensors, which can be positioned one or more flexible circuits, can be incorporated into any layer of the wound dressing. For example, a wound contact layer can have cutouts or slits that allow for one or more sensors to protrude out of the lower surface of the wound contact layer and contact the wound directly. In some situations, one or more sensors can be incorporated into or encapsulated within other components of a wound dressing, such as an absorbent layer.

As shown in FIG. 1A, a sensor integrated substrate 100A can support a plurality of electronic components and a plurality of electronic connections interconnecting at least some of the components. The electronic components can be one or more of any electronic components described herein, such as a sensor, amplifier, capacitor, resistor, inductor, controller, processor, or the like. The electronic connections can electrically connect one or more of the electronic components. The electronic connections can be tracks printed on the substrate, such as using copper, conductive ink (such as silver ink, graphite ink, etc.), or the like. At least some of the electronic connections can be flexible or stretchable or substantially flexible or stretchable.

The plurality of electronic components can include one or more impedance or conductivity sensors 110, which can be arranged in an outer 4×4 grid and an inner 4×4 grid as illustrated in FIGS. 1A-1C. Sensors 110 are illustrated as pads configured to measure impedance or conductivity of tissue across any pair of the pads. Two (or more) excitation pads 115 can be arranged as illustrated to provide the excitation signal across the pads, which is conducted by the tissue and responsive to which impedance or conductance of the tissue can be measured across the pads 110. Electrical components, such as one or more amplifiers 120, can be used to measure impedance or conductance of the tissue. Impedance or conductance measurements can be used to identify living and dead tissue, monitor progress of healing, or the like. The arrangement of the pads 110 in the inner and outer grids can be used to measure the impedance or conductance of the wound, perimeter of the wound, or tissue or areas surrounding the wound.

The plurality of electronic components can include one or more temperature sensors 130 configured to measure temperature of the wound or surrounding tissue. For example, nine temperature sensors arranged around the perimeter of the substrate 100A. One or more temperature sensors can include one or more thermocouples or thermistors. One or more temperature sensors can be calibrated and the data obtained from the one or more sensors can be processed to provide information about the wound environment. In some cases, an ambient sensor measuring ambient air temperature can also be used to assist in eliminating problems associated with environment temperature shifts.

The plurality of electronic components can include one or more optical sensors 150. One or more optical sensors 150 can be configured to measure wound appearance or image the wound. In some cases, a light source or illumination source that emits light and a light sensor or detector that detects light reflected by the wound are used as one or more optical sensors. The light source can be a light emitting diode (LED), such as one or more of white LED, red, green, blue (RGB) LED, ultraviolet (UV) LED, or the like. The light sensor can be one or more of an RGB sensor configured to detect color, infrared (IR) color sensor, UV sensor, or the like. In some cases, both the light source and detector would be pressed up against the skin, such that light would penetrate into the tissue and take on the spectral features of the tissue itself. In some scenarios, one or more optical sensor can include an imaging device, such as a charge-coupled device (CCD), CMOS image sensor, or the like.

In some cases, ultra bright LEDs, an RGB sensor, and polyester optical filters can be used as components of the one or more optical sensors to measure through tissue color differentiation. For example, because surface color can be measured from reflected light, a color can be measured from light which has passed through the tissue first for a given geometry. This can include color sensing from diffuse scattered light, from an LED in contact with the skin, or the like. In some cases, an LED can be used with a proximal RGB sensor to detect the light which has diffused through the tissue. The optical sensors can image with diffuse internal light or surface reflected light.

One or more of the plurality of electronic components can be controlled by a control module. The control module can receive and process one or more measurements obtained by the one or more sensors. An external control module can be connected to at least some of the plurality of electronic components via a connector 140. In some cases, the connector 140 can be positioned at the end of a conductive track portion as illustrated in FIG. 1B or attached to the conductive track portion at a position away from the end as illustrated in FIG. 1A or 1C (such as, attached to the top of the track portion with glue). The control module can include one or more controllers or microprocessors, memory, or the like. In some cases, one or more controllers can be positioned on the substrate, and the connector 140 is not used. In some cases, data and commands can be communicated wirelessly, such as by a transceiver positioned on the substrate, and the connector 140 is not used.

In some cases, additional or alternative sensors can be positioned on the substrate, such as one or more pH sensors, pressure sensors, perfusion sensors, or the like.

In some cases, a substrate can be perforated as illustrated in FIGS. 1B-1C. A plurality of perforations 160 can be formed in the substrate 100B, allowing fluid to pass through the substrate. It may be advantageous to use a perforated substrate in conjunction with application of negative pressure wound therapy, during which reduced pressure is applied to the wound covered by a dressing and which causes removal of fluid (such as wound exudate) from the wound. Perforations 160 can be formed around a plurality of electronic components and connections as illustrated in FIGS. 1B-1C. Perforations 160 can be formed as slits or holes. In some cases, perforations 160 can be small enough to help prevent tissue ingrowth while allowing fluid to pass through the substrate.

In some cases, any of the wound dressings or wound dressing components described herein can be part of a kit that also includes a negative pressure wound therapy device. One or more components of the kit, such as the sensor integrated substrate, secondary dressing, or the negative pressure wound therapy device can be sterile.

Any of the embodiments disclosed herein can be used with any of the embodiments described in International Patent Publication No. WO2017/195038, titled "SENSOR ENABLED WOUND MONITORING AND THERAPY APPARATUS," International Patent Publication No. WO2018/189265, titled "COMPONENT STRESS RELIEF FOR SENSOR ENABLED NEGATIVE PRESSURE WOUND THERAPY DRESSINGS," International Patent Application No. PCT/EP2018/069886, titled "SKEWING PADS FOR IMPEDANCE MEASUREMENT," and International Patent Application No. PCT/EP2018/075815, titled "SENSOR POSITIONING AND OPTICAL SENSING FOR SENSOR ENABLED WOUND THERAPY DRESSINGS AND SYSTEMS," each of which is incorporated by reference in its entirety.

Encapsulation and Stress Relief

In some cases, while it may be desirable for a substrate to be stretchable or substantially stretchable to better conform to or cover the wound, at least some of the electronic components or connections may not be stretchable or flexible. In such instances, undesirable or excessive localized strain or stress may be exerted on the one or more electronic components, such as on the supporting area or mountings of an electronic component, when the substrate is positioned in or over the wound. For example, such stress can be due to patient movement, changes in the shape or size of the wound (such as, due to its healing), or the like. Such stress may cause movement, dislodgment, or malfunction of the one or more electronic components or connections (for example, creation of an open circuit from a pin or another connector becoming disconnected). Alternatively or additionally, it may be desirable to maintain the position of one or more electronic components, such as one or more sensors, in the same or substantially same location or region with respect to the wound (such as, in contact with the wound) so that measurements collected by the one or more electronic components accurately capture changes over time in the same or substantially same location or region of the wound. While the surface of the stretchable substrate may move when, for example, the patient moves, it may be desirable to maintain same or substantially same locations of one or more electronic components relative to the wound.

To address these problems, in some cases, non-stretchable or substantially non-stretchable coating (such coating can sometimes be referred to as "hard coat") can be applied to one or more electronic components, one or more electronic connections, or the like. Hard coat can provide one or more of reinforcement or stress relief for one or more electronic components, one or more electronic connections, or the like. Hard coating can be formed from acrylated or modified urethane material. For example, hard coat can be one or more of Dymax 1901-M, Dymax 9001-E, Dymax 20351, Dymax 20558, Henkel Loctite 3211, or another suitable material. Hard coat can have viscosity from about 13,500 cP to 50,000 cP before being cured or from about 3,600 cP to about 6,600 cP before being cured. In some cases, hard coat can have viscosity of no more than about 50,000 cP. Hard coat can have hardness from about D40 to about D65 and/or linear shrinkage of about 1.5-2.5%.

In some cases, another coating (or coatings) can be applied to encapsulate or coat one or more of the substrate or components supported by the substrate, such as the electronic connections or the electronic components. Coating can provide biocompatibility, shield or protect the electronics from coming into contact with fluids, provide padding for the electronic components to increase patient comfort, or the like. As used herein, biocompatible can mean being in compliance with one or more applicable standards, such as ISO 10993 or USP Class VI. Such coating can sometimes referred to as "conformal coat" or "soft coat." Soft coat can be stretchable or substantially stretchable. Soft coat can be hydrophobic or substantially hydrophobic.

Soft coat can be formed from one or more suitable polymers, adhesives, such as 1072-M adhesive (for example, Dymax 1072-M), 1165-M adhesive (such as, Dymax 1165-M), parylene (such as, Parylene C), silicones, epoxies, urethanes, acrylated urethanes, acrylated urethane alternatives (such as, Henkel Loctite 3381), or other suitable biocompatible and substantially stretchable materials. Soft coat can be thin coating, for example, from about 80 microns or less up to several millimeters or more. Soft coat can have hardness lower than about A100, A80, A50 or lower. Soft coat can have elongation at break higher than about 100%, 200%, 300% or more. Soft coat can have viscosity of about 8,000-14,500 centipoise (cP). In some cases, coating can have viscosity no less than about 3,000 cP. In some cases, coating can have viscosity less than about 3,000 cP.

Any of the hard or soft coats described herein can be applied by one or more of laminating, adhering, welding (for instance, ultrasonic welding), curing by one or more of light, UV, thermal (such as, heat), or the like. Any of the hard or soft coat described herein can be transparent or substantially transparent to facilitate optical sensing. Any of the coatings described herein can retain bond strength when subjected to sterilization, such as EtO sterilization. Any of the coatings described herein can be modified to fluoresce, such as under UV light.

Figure 2A:
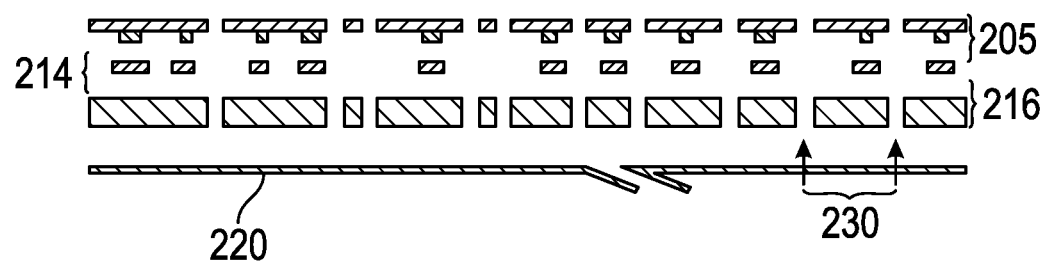
FIGS. 2A-2B illustrates cross-sections of wound dressings.
Figure 2B:
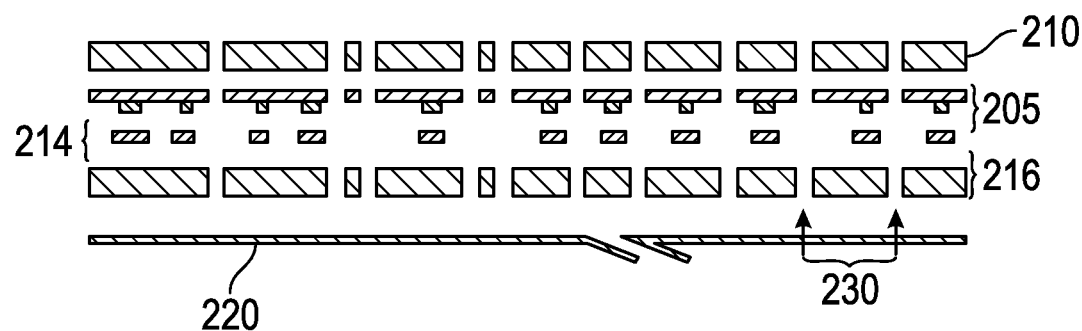

FIGS. 2A-2B illustrate cross-sections of wound dressings that include sensor integrated substrates. Dressing 200A shown in FIG. 2A can include a sensor integrated substrate 205 supporting a plurality of electronic components (shown as protruding from the substrate) and a plurality of electronic connections, as described herein. The dressing 200A can include hard coat 214, applied to one or more electronic components or connections. In some cases, hard coat can be applied to areas where electronic components are connected to electronic connections. This can reinforce these connections. In some cases, hard coat can be applied to each of the one or more of the electronic components or connections.

The dressing 200A can include soft coat 216, which can be applied to the entire wound facing side of the substrate. Soft coat 216 can be applied to an entire or substantially entire area of the wound facing side of the substrate to encapsulate the substrate, electronic components, and connections. In some cases, soft coat 216 can be applied to certain regions of the substrate, such as those regions supporting one or more of electronic components or connections.

As illustrated in FIG. 2A, a plurality of perforations 230 can be formed through one or more of the substrate, hard coat, soft coat, and/or wound contact layer. As described herein, perforations can be made in regions or areas of the substrate that do not support electronic components or connections.

The dressing 200A can include a protective layer 220 applied to the substrate. The protective layer 220 can be made of paper, such as laminated paper. The protective layer 220 can protect the substrate. The protective layer 218 can include a plurality (such as two) handles. The handles can be applied in a folded configuration, in which a slit separating the handles is covered by one of handles folded over the slit. In some cases, the protective layer 218 can be similar to the protective layer used in the Allevyn Life Non-Bordered dressing.

In some cases, the substrate can be used in combination with one or more wicking layers and/or absorbent layers on the opposite, non-wound facing side (also referred to herein as second side) of the substrate. The wicking layer can facilitate passage of fluid through the layers below the wicking layer. For example, the wicking layer can transport (or "wick") fluid away from the lower layers, such as from the substrate, toward one or more upper layers positioned over the wicking layer. Such one or more upper layers can include one or more absorbent materials as described herein. In some cases, the wicking layer can be formed from foam, such as foam similar to that used in the Allevyn Life Non-Bordered dressing. The wicking layer can be extensible or substantially extensible.

As illustrated in the dressing 200B of FIG. 2B, additional layer of soft coat 210 can be positioned over the non-wound facing side of the substrate between the substrate and the wicking layer 212. For example, soft coat 210 can protect the non-wound facing side of the substrate from fluid if the substrate is formed from material that is not impermeable to fluid. In such case, soft coat 210 can be hydrophobic or substantially hydrophobic. Soft coat 210 can be made of same or different material than soft coat 218. Soft coat 210 can be perforated as illustrated and described. In some cases, soft coat can encapsulate the entire substrate, including both the wound facing and non-wound facing sides.

Figure 3A:
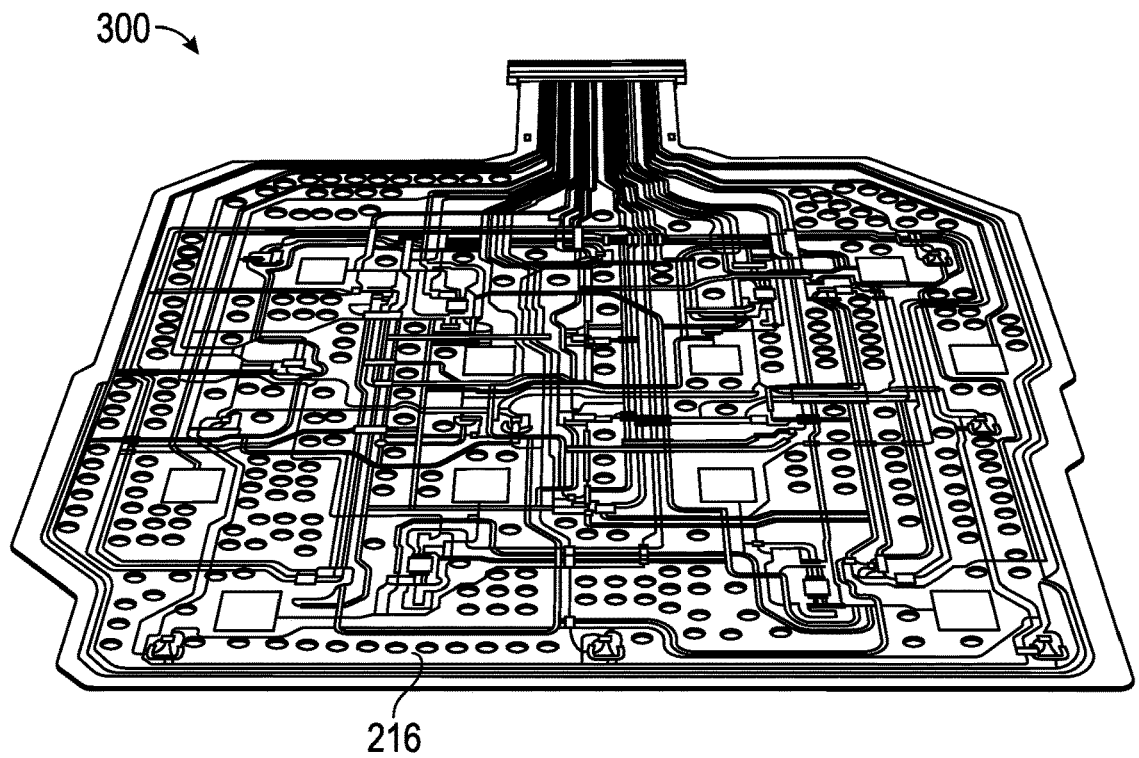
FIGS. 3A-3B illustrate perspective and top views of a perforated substrate supporting electronic components.
Figure 3B:
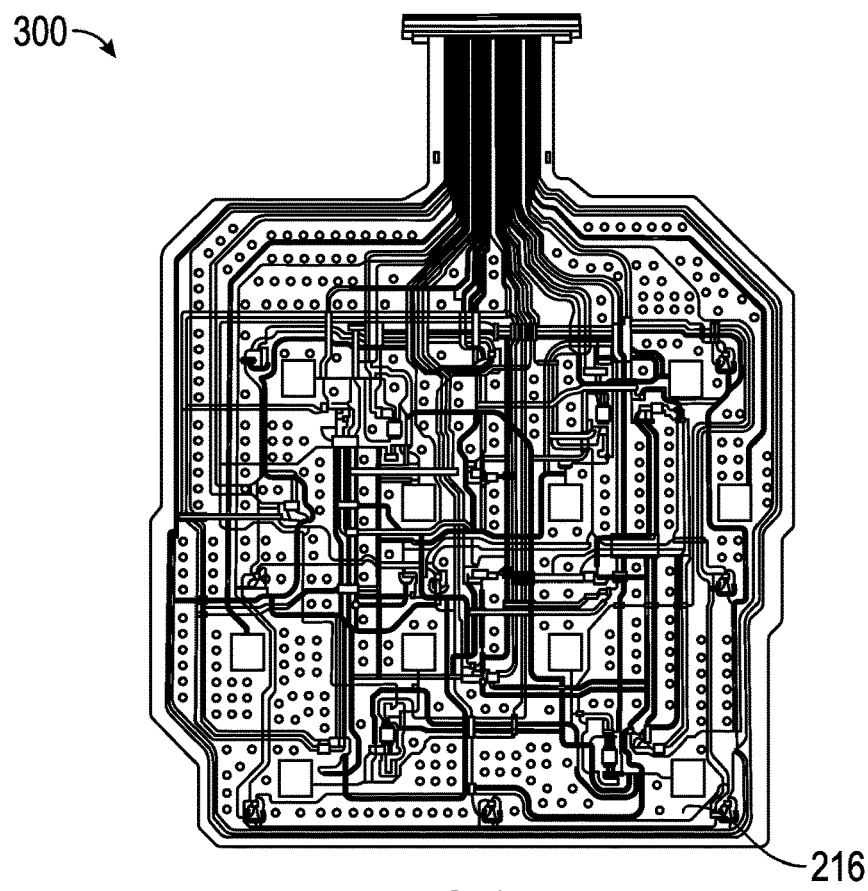

FIGS. 3A-3B illustrate coated sensor integrated substrates 300. The substrates 300 are illustrated with non-wound facing side 216 up. The substrates 300 can be similar to any of the substrates described herein.

Any of the embodiments disclosed herein can be used with any of the embodiments described in International Patent Application No. PCT/EP2018/069883, titled "BIOCOMPATIBLE ENCAPSULATION AND COMPONENT STRESS RELIEF FOR SENSOR ENABLED NEGATIVE PRESSURE WOUND THERAPY DRESSINGS," which is incorporated by reference in its entirety.

Coating Techniques

A range of films or substrate material can be considered as described herein. In some cases, polyurethane (PU) material or film can be used. PU film is typically hydrophilic and as such there are a number of elements that need to be considered in the design of a PU film mounted with electronics where there is an electrical circuit and also components that may contain chemical species (materials) that it is desirable to keep isolated from the human body (for example the chemical species that may be found within electronic components).

Figure 4A:
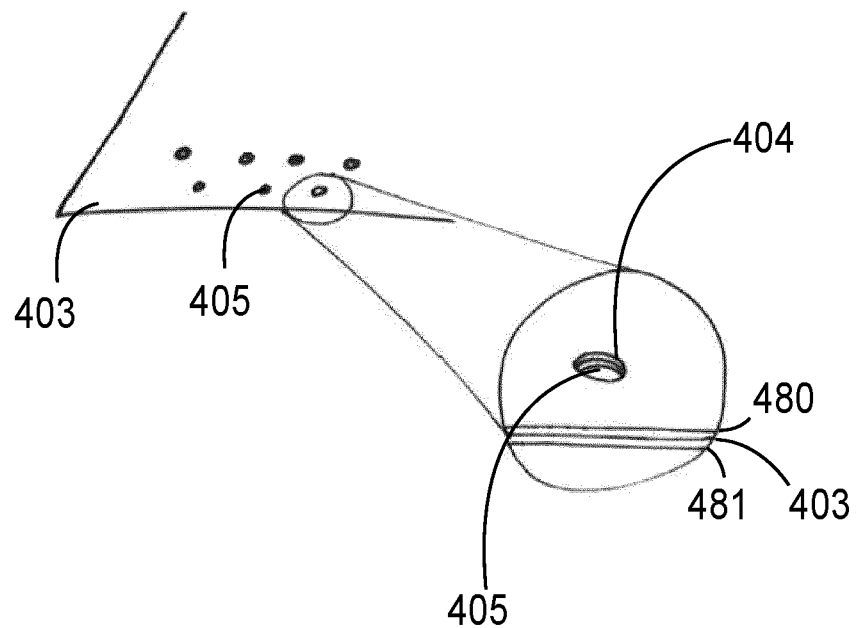
FIGS. 4A-4B illustrate embodiments of uncoated perforations within the substrate.
Figure 4B:
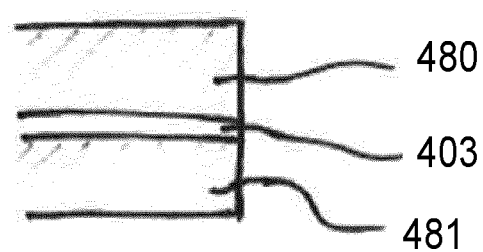
Figure 4C:
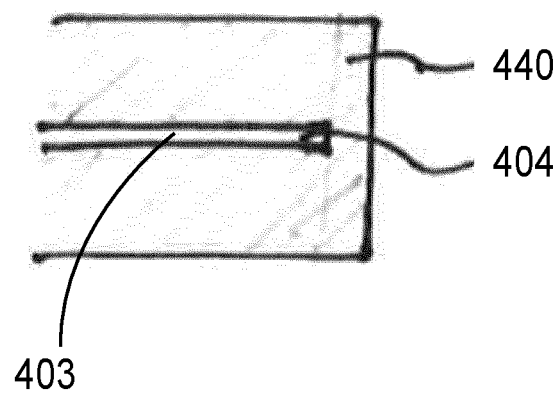
FIG. 4C illustrates the coated exterior surface of the perforations within the substrate.

In some cases, as the substrate is formed the coated substrate can be perforated after coating. As wound exudate and vapors of wound exudate will flow over all surfaces of a wound contact layer it is preferable to coat the front and back of the sheet. When this is done and then the sheet is perforated, this has the potential to expose the edge of the substrate on the cut line. FIGS. 4A-4B illustrate uncoated perforations within the substrate. FIGS. 4A and 4B illustrate an embodiment of a substrate 403 with coating. In some cases, the substrate 403 can be substantially flexible and can have a first, wound-facing side supporting a plurality of electronic components (not shown) and a second side opposite the first side. The substrate 403 comprises a plurality of perforations 405 formed though the substrate as shown in FIG. 4A. The plurality of perforations 405 can have a wall 404 on the exterior surface of the plurality of perforations 405. In some cases, a substantially non-stretchable coating can be applied to at least some of the plurality of electronic components (not shown) as described with reference to FIGS. 2A-2B. A first substantially stretchable coating 480 can be applied to the first side of the substrate. In some cases, the first stretchable coating can be applied over the substantially non-stretchable coating as described with reference to FIG. 2A-2B. A second substantially stretchable coating 481 can be applied to second side of the substrate. In some cases, the first substantially stretchable coating and the second substantially stretchable coating can be the same coating materials. In other cases, the first substantially stretchable coating and the second substantially stretchable coating can be different coating materials. When the perforations are made or sections cut away after coating, the edge of the substrate can be exposed. As illustrated in FIGS. 4A-4B, the wall 404 on the exterior surface of the perforations 405 are left uncoated when the perforations are made after coating. It may be possible for liquids such as aqueous (water based) liquids or water vapor to migrate along the substrate in the plane of the substrate under the coating. It may also be possible that imperfections at the interfacial junction between the substrate and encapsulant allow liquids to travel from the wound to the electronics. Such imperfections may be present at the time of manufacture (for example gaps, tenting, channels between the substrate and encapsulant) or may be introduced during the life cycle of the sheet (for example delamination of the substrate from the encapsulant or the introduction of imperfections, potentially as a result of strain, or repeated strain on the sheet). To address these issues, it can be important to utilize a procedure to coat the walls 404 on the exterior surface of the perforation in the substrate 403. The coated wall 404 of the perforation is illustrated in FIG. 4C. In some cases, as illustrated in FIG. 4C, the wall 404 of the plurality of perforations can be at least partially coated with at least one of the coatings as illustrated by coating 440. As used herein, the exterior surface of the perforation refers to the surface of the perforation within the channel that would be exposed to wound exudate when the perforated sheet is positioned over a wound.

After coating of the face with electronics, attempting to remove the release handle and/or protective layer has led to stress being applied across the sheet with non-uniform stretching of the sheet and generation of a sheet that is not dimensionally uniform. Application of a coating to the reverse side of the sheet (the side not carrying the electronics) with subsequent curing has entrained this dimensional non-uniformity. The generation of perforations between electrical tracks and components requires high levels of accuracy and precision (for example, nominal pitch between tracks can be 200 microns). Perforation methods such as laser ablation based on optical visioning systems referencing fiducial markers will require tight dimensional tolerances on the sheet at the time of perforating.

Figure 5:
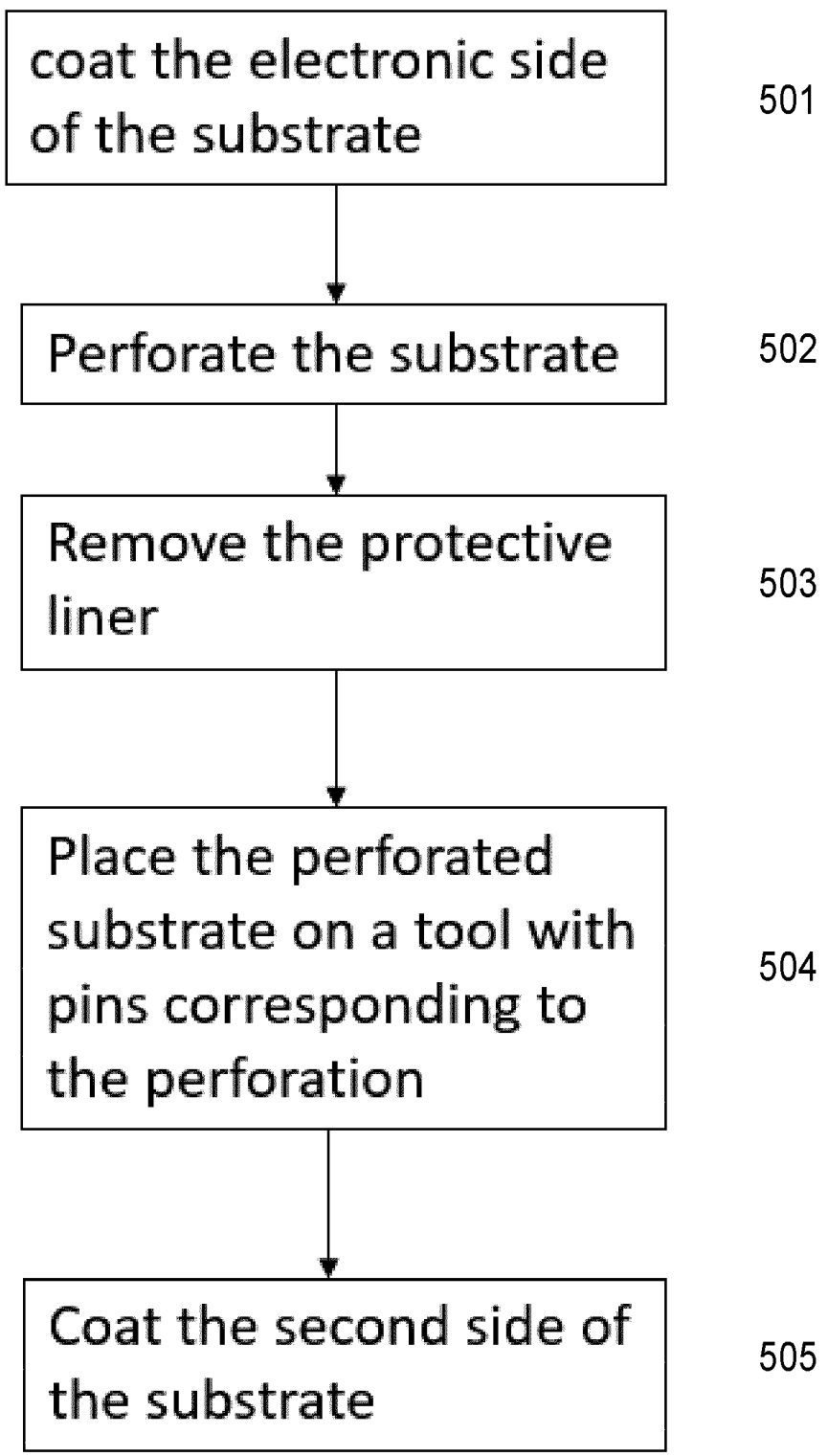
FIG. 5 illustrates an embodiment of the method of manufacturing the substrate.

In some cases, the substrate can be manufactured with the method illustrated in FIG. 5. The electronic side of the substrate (or first side of the substrate) can be coated first 501 with one or more coatings as described herein. The substrate can then be perforated 502. The perforations can be performed in a predetermined pattern designed to avoid any of the electronic components, electronic connections, and/or electronic tracks. The substrate can be supported by a protective liner throughout the coating of the electronics side of the substrate and the perforations. The protective liner can be positioned on the side of the substrate opposite the electronic components (or the second side of the substrate). After perforation of the substrate, the protective liner can be removed 503. Once the protective liner is removed, the second side of the substrate is exposed. The perforated substrate is then placed on a tool with pins corresponding to each perforation 504. The perforated substrate is placed electronics side or first side facing down. The second side of the substrate is then coated 505.

In some cases, more than one coating can be applied to the electronics side of the substrate. In some cases, the method of manufacturing a wound dressing can include coating a first, wound-facing side or electronics side of a substantially flexible substrate with a first coating. The first side of the substrate can support a plurality of electronic components. A first coating can be applied to at least some of the plurality of electronic components. The method can further include coating the first side with a second coating. In some cases, the second coating can be applied over the first coating.

The method can then include perforating the substrate coated with the first and second coating to create a plurality of through holes or perforations through the substrate coated with the first and second coating, the plurality of perforations comprising a wall and the plurality of perforations configured to facilitate passage of fluid through the substrate.

The substrate can have a second side opposite the first side. The method can further include coating the second side of the substrate with the second coating. Any protective liners can be removed from the second side of the substrate prior to coating the second side of the substrate. The substrate can be positioned on a tool with a plurality of pins that extend through the plurality of perforations when the second coating is applied and the second coating can coat the wall of the plurality of perforations.

In some cases, after coating of the second side of the substrate, the method can further include adhering a protective layer to the substrate and the protective layer can be configured to be removed to expose the substrate before use.

This coating technique with the perforated substrate on the tool with pins can allow for coating of the reverse side of the sheet, coating the internal channel of the perforation, and not cause a detrimental effect to the coating of the electronic face of the sheet. In some cases, this can be achieved through depositing an abundance of material at the edge of the perforation while using a tool with pins. In some cases, the tool with pins can also provide some stability to the substrate once the protective liner is removed.

In some cases, coating of the first side and coating of the second side of the substrate can be reversed.

Figure 6A:
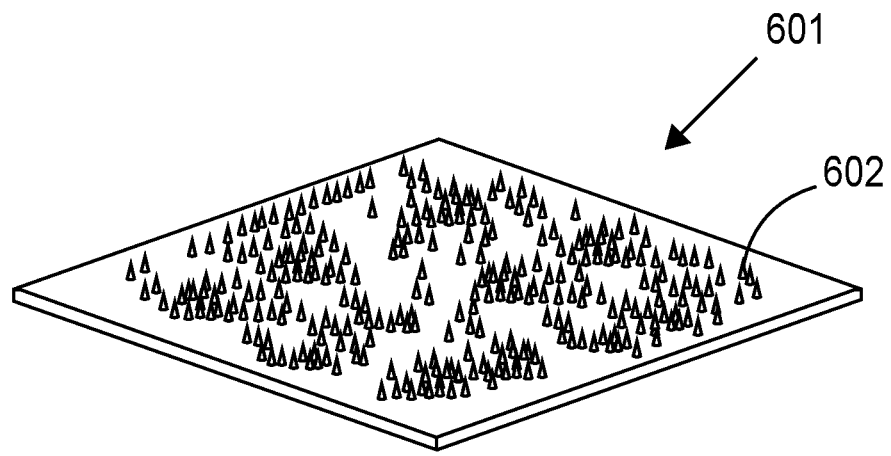
FIG. 6A illustrates an embodiment of a tool that can be used to allow the perforations to remain open.
Figure 6B:
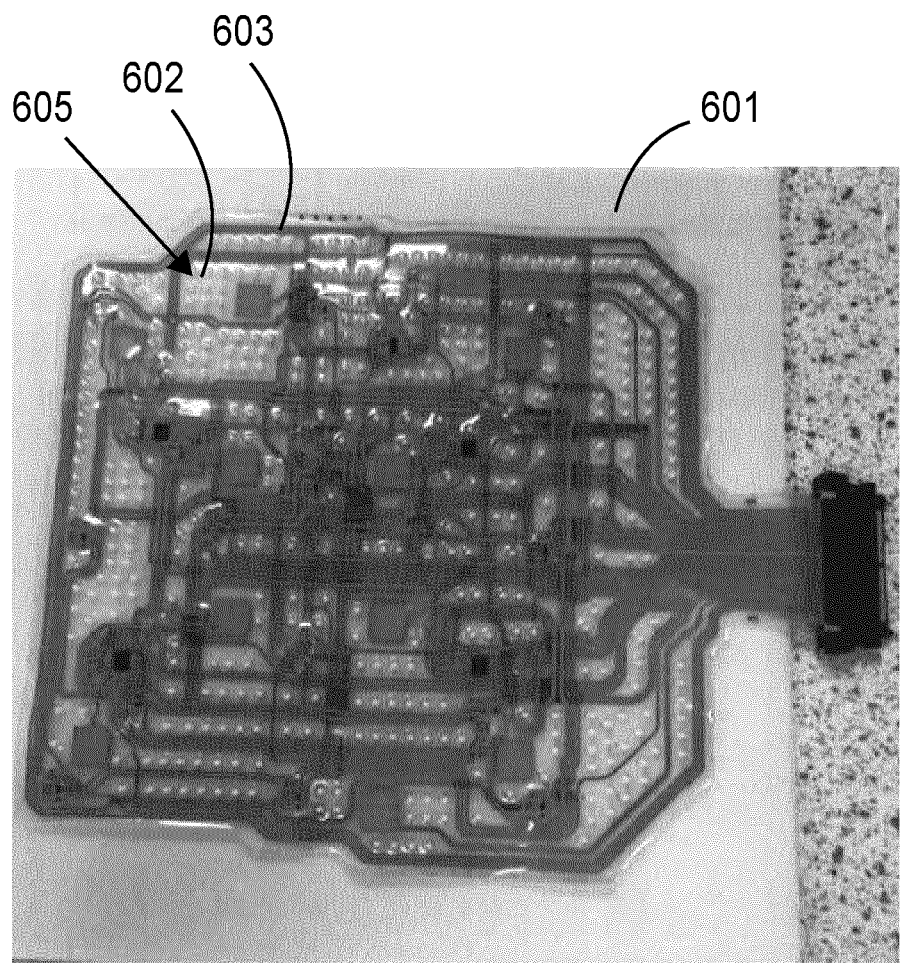
FIG. 6B illustrates an embodiment of a perforated substrate positioned on a tool with pins that extend through the perforations of the substrate.
Figure 6C:
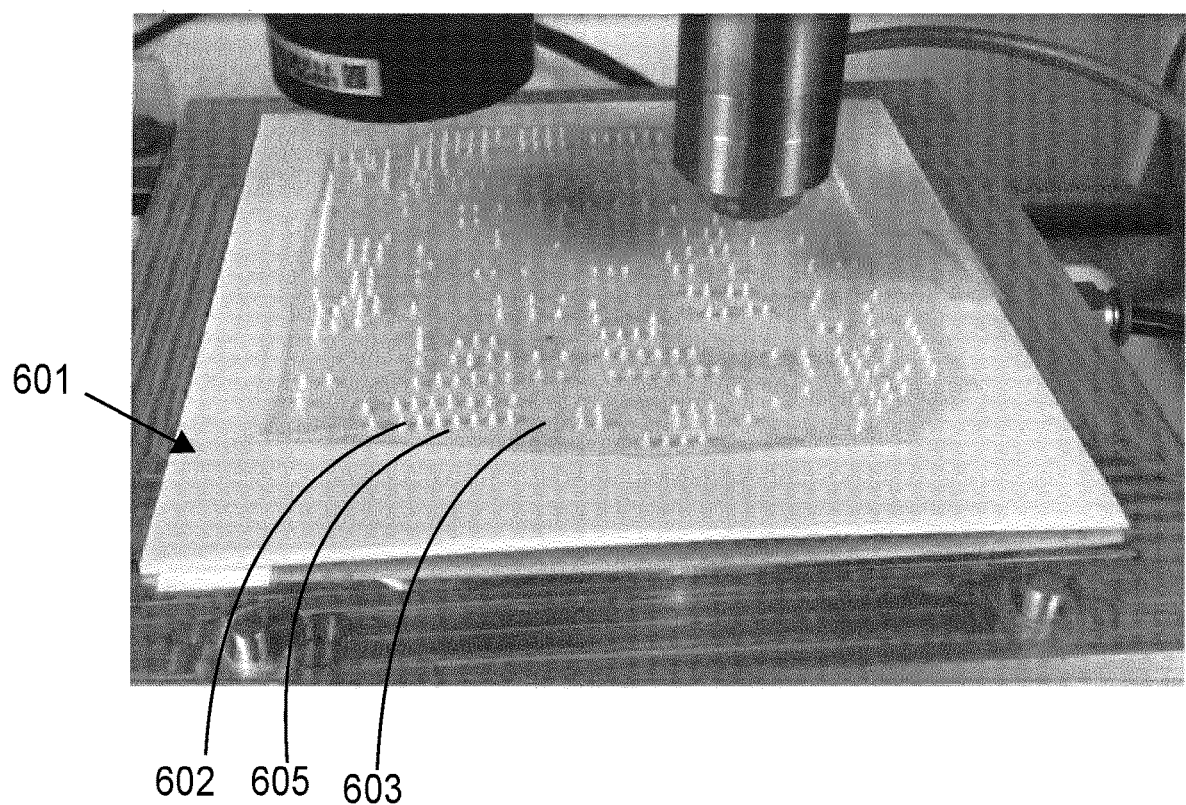
FIG. 6C illustrates an embodiment of a substrate with perforations being coated with a spray coating after perforations are made in the substrate.

FIG. 6A illustrates an embodiment of a tool 601 with pins 602 that can be used to allow the perforations to remain open when the substrate is coated after the perforations are made. FIG. 6B illustrates an embodiment of a perforated substrate 603 positioned on a tool 601 with pins 602 that extend through the perforations 605 of the substrate 603. As illustrated in FIG. 6B, the perforations 605 can be positioned in areas of the substrate that are not supporting the electronic components and/or electronic tracks. FIG. 6C illustrates a substrate 603 with perforations 605 being coated with a spray coating after perforations are made in the substrate. The substrate 603 shown in FIG. 6C is positioned on a tool 601 with pins 602 that extend through the perforations to prevent closure of the perforations due to the coating application. In some cases, the coating can extend between an exterior surface of the perforations to coat the wall on the exterior surface of the perforations similar to the illustration of the wall 404 in FIG. 4C. In some cases the substrate 603 can be removed from the tool 601 with pins prior to the curing of the coating. In some cases, when the tool with pins is removed prior to curing, the movement of the pins through the opening of the perforation can allow the coating to be pulled through the perforations and assist with uniformly coating the walls on the exterior surface of the perforations.

Figure 7A:
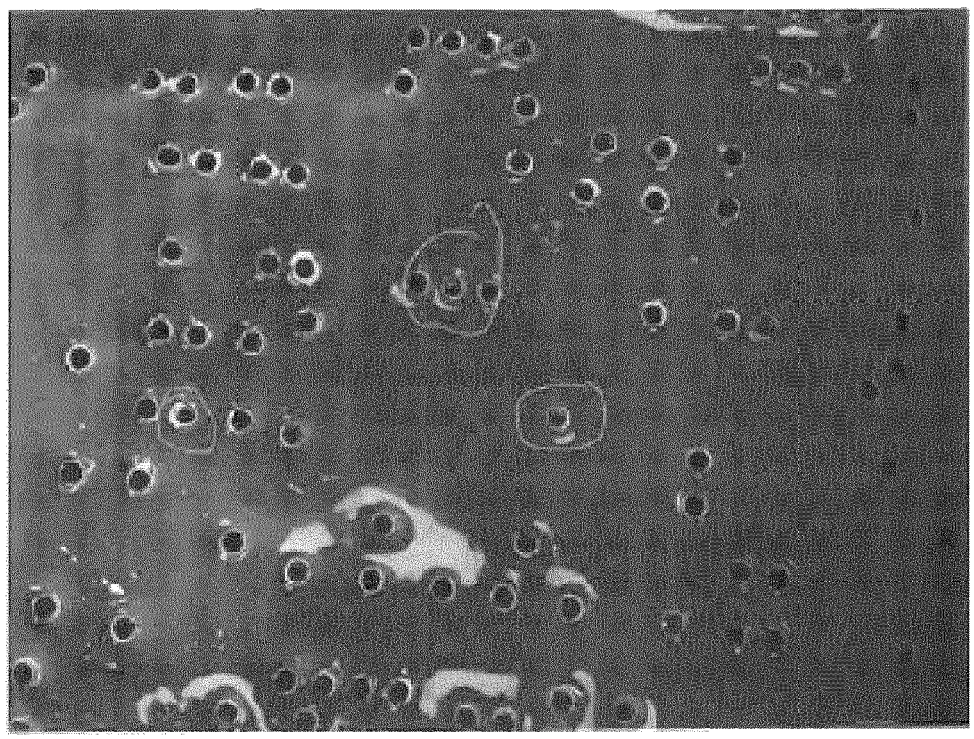
FIG. 7A shows an image of a substrate where the substrate with perforations is coated without using the tool with pins to prevent the coating material from closing the perforations.
Figure 7B:
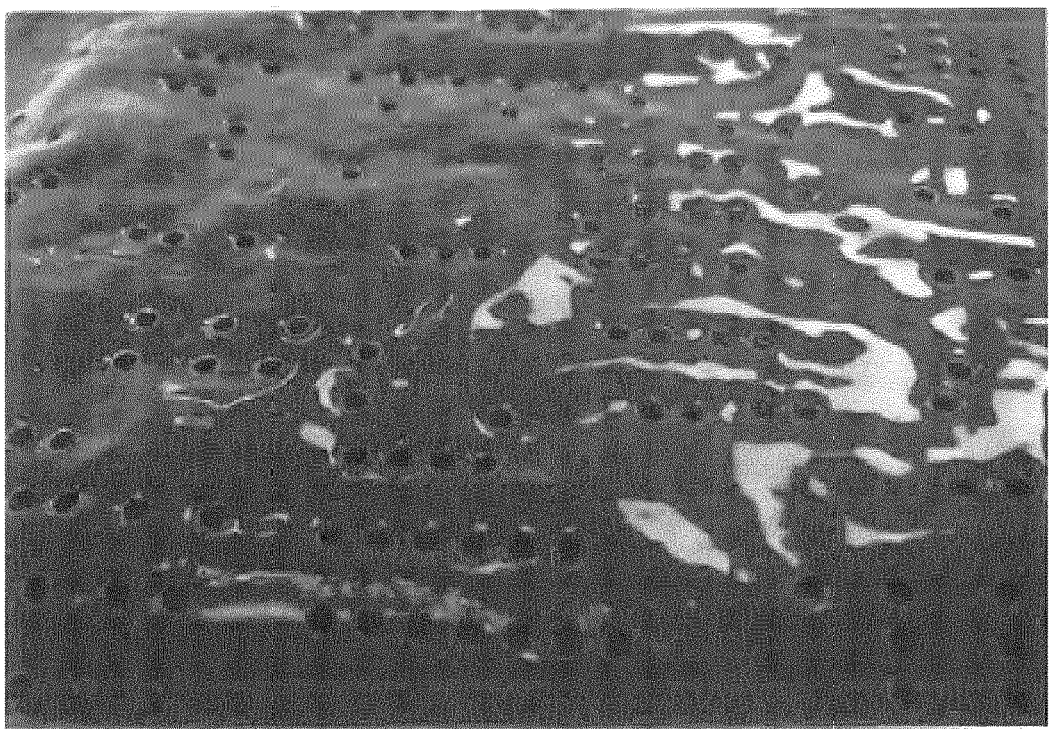
FIG. 7B show an image of a substrate where the substrate with perforations is coated while using the tool with pins to prevent the coating from closing the perforations.

FIG. 7A shows an image of a substrate where the substrate with perforations is coated without using the tool with pins to prevent the coating material from closing the perforations. As shown with the circled regions in FIG. 7A, the perforations can experience reduced size due to the coating closing the perforation. FIG. 7B show an image of a substrate where the substrate with perforations is coated while using the tool with pins to prevent the coating from closing the perforations. As shown in FIG. 7B, the perforations are mostly consistently open and more uniformity in the perforation sizes.

In some cases, the sizes and shapes of the pins can be altered to control the flow of the coating into the perforation channels. Various designs for the pins on the tool can be used. In some cases, the pins on the tool can have a diameter that is smaller than the diameter of the perforations creating gaps between the perforations of the sheet and the pins. These gaps can influence the amount of uncured coating or encapsulant that can flow onto the exterior surface of the perforations to coat the wall.

FIG. 8A illustrates a substrate 803 positioned on a tool 801 with pins 802 where the diameter of the pin 802 is the same or substantially the same as the diameter of the perforation 805 in the substrate 803. As illustrated in FIG. 8A, there is little to no gap between the exterior surface of the perforations of the substrate 803 and the pin 802. FIG. 8B illustrates a substrate 803 positioned on a tool 801 with pins 802. As illustrated in FIG. 8B, there is a gap 806 between the wall 804 on the exterior surface of the perforations of the substrate 803.

In some cases, designs with different heights or shapes of pins can be used. This can influence the amount of uncured coating or encapsulant that can be accumulated on the pin, flowing down onto the sheet, into the channel of the perforation or otherwise curing on the pin requiring consideration at the point of extraction of the pins from the perforations. For example, FIG. 8C illustrates an embodiment with a pin having a greater height than the pin in FIG. 8B.

In some cases, different shapes of pins can also be used to control the flow of the coating onto the substrate and into the channel of the perforation and/or onto the walls on the exterior surface of the perforations. In some cases, the walls of the perforations can have a uniform coating. In some cases, the walls of the perforations can be at least partially non-uniformly coated. In other cases, the walls of the perforations can be coated with a pattern or a shape. The pattern or shape of the coating formed on the wall can be created by pins of different designs. In some cases, the size of the perforations can be controlled based on the configuration of the pins.

In some cases, the perforations can be an opening that is greater than or equal to 0.25 mm in diameter (measured at its smallest dimension). In some case, the perforations can be any size or shape. In some cases, the perforations can be oval, elongated, circular, or any other shape. In some cases, the plurality of perforations can be various shapes formed in the substrate.

In some cases, the substrate can have cut outs instead of or in addition to the perforations in the substrate. The cut outs can be any size or shape. In some cases, the cut outs can be oval, elongated, circular, or any other shape. In some cases, the cut outs can be slits or rectangular cut out within the substrate. In some cases, the plurality of cut outs can be different shapes formed in the substrate. In some cases, the edges or walls on the exterior surface of the cut outs can be coated utilizing methods and techniques similar to those described herein with reference to the perforations. The cut outs can be coated using a tool with pins and the pins can have a complimentary or substantially complimentary shape but, in some cases, a smaller size to that of the cut out so as to allow the coating to pass between the exterior surface of the cut outs and the side of the pin within the cut out. This process can be similar to the methods and techniques described herein with reference to the perforations.

The pins can be manufactured with design considerations to mitigate or otherwise optimally control the flow of uncured encapsulant down the pin onto the substrate and into the channel of the perforation. The pins can be shaped to be cylindrical, cylindrical with a concave upper surface, cylindrical with a convex upper surface, domed, conical, hollow, and/or any other shape. In some cases, designs that are not axially symmetrical can also be used.

A number of factors are important when considering liquid flow on the pins. In some cases, the surface energy of the material (high surface energy, low surface energy) can be important in the design of the pins. For example materials such as silicone, uPVC, PTFE, glass and 316L stainless steel can be used. The surface finish of the materials can be considered. The surface finish of the materials can be defined, for example through stipulation of a roughness parameters such as Ra (arithmetical mean roughness value, EN ISO 42871). The use of a pattern can be considered. Other considerations can include, the temperature of the pins, the temperature of the uncured encapsulant, and/or the temperature of the complete system during application and curing. Shapes of the pins can control the degree of uncured coating or encapsulant that runs off from the pin. The shapes of the pins can be coupled with the surface energy of the material, texture, and/or temperature. FIGS. 8D-8F illustrate embodiments of different shapes of pins 802 that can be used. FIG. 8D illustrates a substrate 803 on a tool 801 with a pin 802 with a pointed end. FIG. 8E illustrates a substrate 803 on a tool 801 with a pin 802 with a dome shape. In some cases, the pointed end or dome shape can help the coating flow down the pin into the exterior surface of the perforations. FIG. 8F illustrates a substrate 803 on a tool 801 with a pin 802 with a channel in the pin.

Figure 8G:
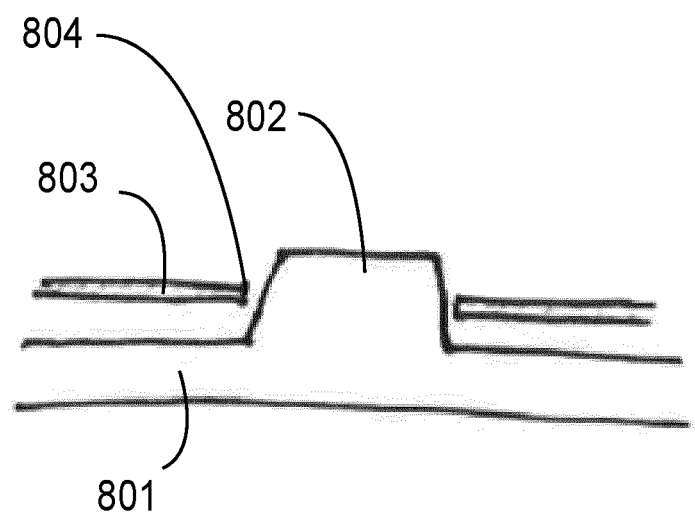
FIGS. 8G and 8H illustrate embodiments of a tool with pins that are tapered.
Figure 8H:
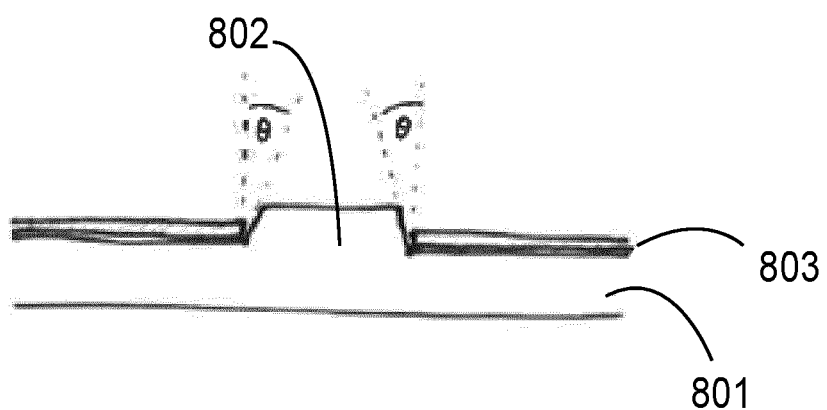

FIGS. 8G and 8H illustrate a tool 801 with pins 802 that are tapered. The pins can be tapered to control the liquid flow onto the exterior surface of the perforation channel and thereby coating the wall of the perforations. The pins can be tapered to aid in withdrawal of the pins following curing of the coating or encapsulant. The pins can be tapered with a defined angle as illustrated in FIG. 8H.

Figure 8I:
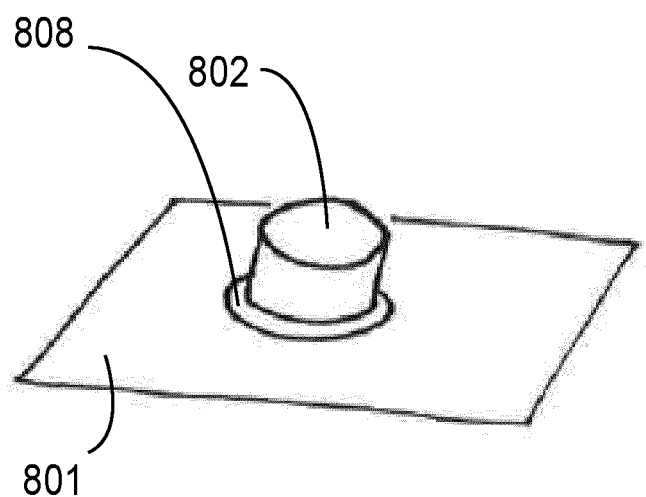
FIGS. 8I and 8J illustrate embodiments of the tool with pins with gutters positioned at the base of the pins.
Figure 8J:
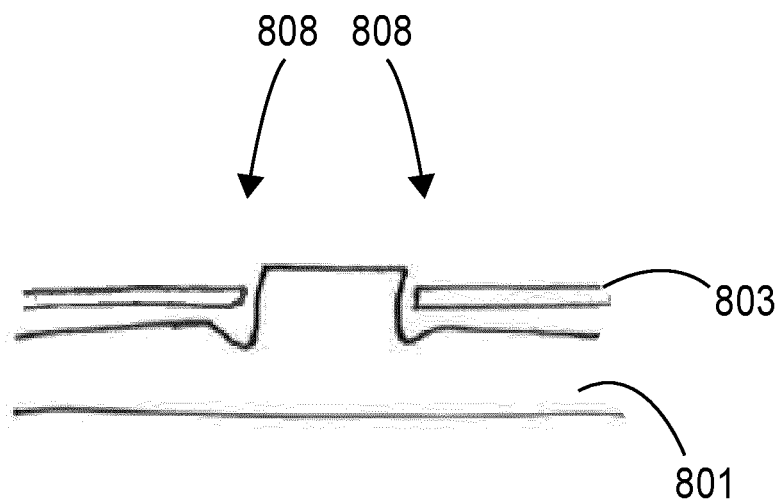

To avoid surplus encapsulant flowing through the perforation and curing on the electronic face of the substrate, gutters can be introduced into the tool to accommodate for surplus uncured encapsulant. In some cases, the gutters 808 can be positioned at the base of the pin 802 where the pin 802 connects to the remainder of the tool 801 as illustrated in FIGS. 8I and 8J.

Figure 9A:
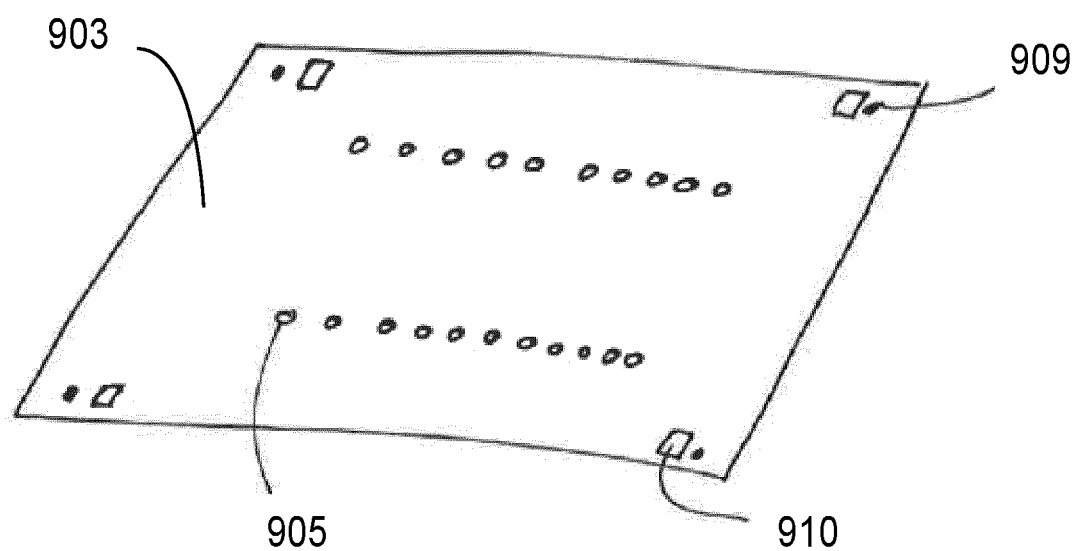
FIGS. 9A and 9B illustrate embodiments of a substrate with perforations and fiducial markers and corresponding perforations for reference pins.

Given the importance of dimensional accuracy, the substrate can benefit from accurate location during processing. This can be achieved through the use of fiducial markers on the substrate for optical systems and/or through the use of perforations for registration (or reference) pins on the sheet. FIG. 9A illustrates an embodiment of the substrate 903 with perforations 905 and fiducial markers 909 and corresponding perforations 910 for registration pins 911. In some cases, the registration pins and corresponding registration perforation designs could take many forms. For example the perforations used on film (movie) stock or photography negative stock could be used on multiple sides of the sheet to allow multiple registration points.

Figure 9B:
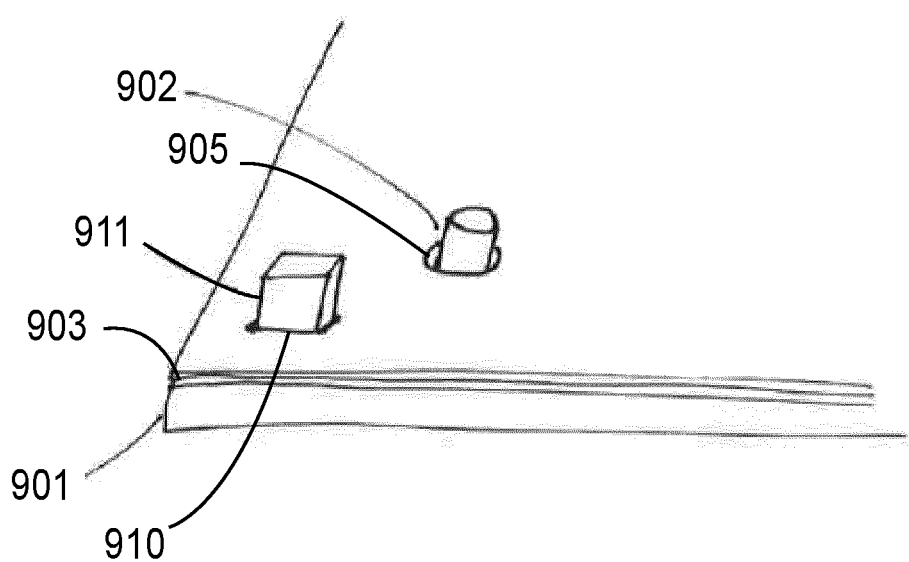

In some cases, the gap permitted between registration perforations 910 and corresponding registration pins 911 (shown in FIG. 9B) may be very small for improved accuracy. In contrast, the gap permitted between pins 902 and substrate perforations 905 can be optimized with consideration of liquid flow around the pin 902 and onto the exterior surface of the perforation channel as described herein and illustrated in FIG. 9B. In some cases, for each substrate perforation pattern there can be a corresponding tool with pins.

Figure 10:
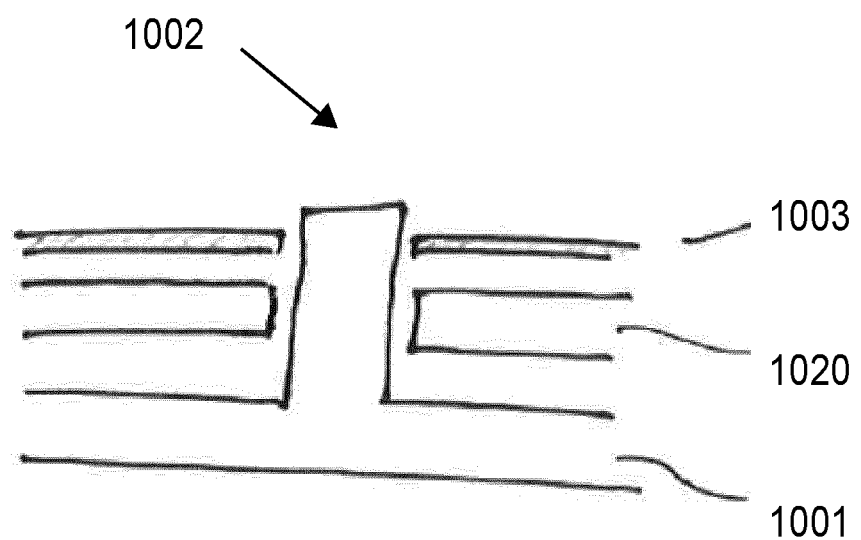
FIG. 10 illustrates an embodiment of a tool base plate for use with the tool with pins.

To aid with removal of the substrate 1003 with perforation from the pins 1002 and/or to help with the mitigation of unwanted pooling of uncured coating or encapsulant, a tool base plate 1020 can be used to support the substrate 1003. The tool base plate 1020 as shown in FIG. 10 can be made to facilitate extraction of the pins 1002 whilst supporting the electronics substrate 1003 and/or providing a channel for surplus coating or encapsulant to flow down. The tool base plate 1020 can be positioned between the substrate 1003 and the tool 1001 with pins 1002. The substrate 1003 can be supported by the tool base plate 1020 when the substrate 1003 is withdrawn from the tool 1001 with pins 1002.

Figure 11:
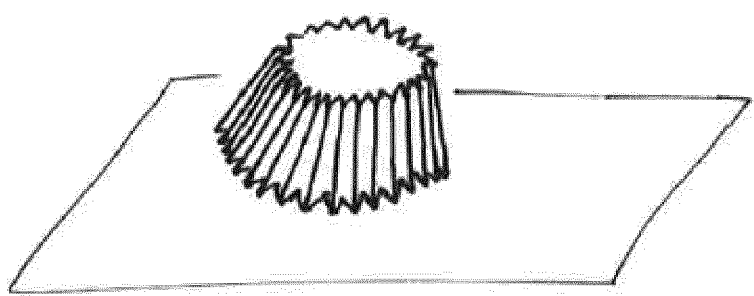
FIG. 11 illustrates an embodiment of a conical pin with ridges or a truncated cone with grooves.

To aid with fluid transfer from one side of the sheet to the other, the introduction of channels or micro-channels into the exterior surface of the encapsulant may be beneficial. Pins may be made with a profile such that grooves are introduced into the exterior surface of the perforation channel when the wall is coated. FIG. 11 illustrates an embodiment of a conical pin with ridges or a truncated cone with grooves. The conical pin with ridges can be used to create grooves on the exterior surface of the perforations. With other cutouts or shapes on the pins, many other designs are also feasible to create patterns or shapes on the exterior surface of the perforations when the wall is coated.

In some cases, where the encapsulant is UV curable, it may be difficult to cure the material that may have travelled along the exterior surface of the perforation channel and may have reached the opposing face of the sensor sheet. Some material used for the substrate can inhibit transfer of given frequencies of UV and as such may inhibit curing. In some cases, tools made of UV transmissive materials or with UV transmissive pins may be considered. Such materials can include: Fused Silica, Quartz, Vycor, formulations of Pyrex, Sapphire and a variety of fluoride compounds. Alternatively the substrate may be subject to UV curing on both sides following removal of the tool with pins.

After coating and curing of the second side (non-electronics side) of the substrate, a protective liner can be applied to the second side of the substrate as shown in FIGS. 2A-2B.

In some cases, the sensor sheet coated with a hard coat (substantially non-stretchable coating) and a soft coat (substantially stretchable coating) on the component side. The substrate can then be perforated to create the perforations as described herein. The cutting and perforation can also be extended to cut the outline of the substrate too. The substrate can be turned over and any protective liners can be removed. The substrate can be applied to the tool with pins and the design of the tool can include a tray such that the outer edge of the sheet is about 2 mm from the edge of the tray or any suitable distance from the end of the tray to allow the tray to extend beyond the outer perimeter of the substrate.

When the soft coat is spread and/or sprayed onto the tool with pins and over the substrate it can cover the reverse side of the substrate and encapsulates all the cut edges of the substrate. In some cases, the soft coat can be gently spread and allowed to settle which can assist in the coating process. In some cases, alignment of the substrate on the tool with pins can be critical to ensure that the substrate sits in the nominal centre (i.e. nominally concentrically) of each perforation. Failure to do so can result in a reduced amount of coating encapsulating the substrate. In the cases of circular perforations, this would result with a (smaller) perforation in the soft coat that was excentric relative to the (larger) perforation in the substrate that it sits in. In other cases, the (smaller) perforation in the soft coat can be concentric relative to the (larger) perforation in the substrate that it sits in.

In some cases, the soft coat could be applied to the second side of the substrate without the use of a tool with pins. In such cases, a second perforation step can be performed to finalize the perforation process. This second perforation step could utilize an optical visioning system which can aid significantly with alignment. After the second perforation step, plugs of silicone may need to be removed from the perforation spots.

When the substrate is coated without the tool with pins, the steps for processing the substrate can be similar to those described here with some changes. Similar to the steps described previously, the sensor sheet can be hard coated on the component side and then the soft coat can be applied on the component side or first side of the substrate. The existing process step of perforating the substrate is carried out. In some cases, the process of cutting the perforation can also be extended to cut the outline of the substrate too. The substrate can be turned over and any protective liners can be removed. Instead of the tool with pins, the substrate can be placed on a flat tray. In some cases, the tray can allow for the outer edge of the substrate to be about 1 cm from the edge of the tray. Any size tray can be used that provides a suitable distance from the outer perimeter of the substrate to the end of the tray to allow the tray to extend beyond the outer perimeter of the substrate. When the soft coat is spread or sprayed onto the tray and over the substrate it can cover the second side of the substrate and fill the perforations and encapsulate the cut edges of the substrate. The soft coat can be gently spread and allowed to settle which can assist in coating the entire substrate and edges. With this process, the alignment may not be critical. The resulting substrate will then undergo a second laser perforation step, whereby the second set of perforations through the soft coat can be stepped back by a defined amount from the first perforations in the substrate providing smaller bores and a larger outer sheet outline then done with the first cutting step. With these steps the substrate can be encapsulated with coating.

OTHER VARIATIONS

In some cases, one or more electronic components can be positioned on the side of a substrate opposite the side that faces the wound. Systems and methods described herein are equally applicable to such wound contact layers. Although certain embodiments described herein relate to wound dressings, systems and methods disclosed herein are not limited to wound dressings or medical applications. Systems and methods disclosed herein are generally applicable to electronic devices in general, such as electronic devices that can be worn by or applied to a user.

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value. Moreover, although blocks of the various processes may be described in terms of determining whether a value meets or does not meet a particular threshold, the blocks can be similarly understood, for example, in terms of a value (i) being below or above a threshold or (ii) satisfying or not satisfying a threshold.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some cases, the actual steps taken in the processes illustrated or disclosed may differ from those shown in the figures. Depending on the embodiment, certain of the steps described above may be removed, others may be added. For example, the actual steps or order of steps taken in the disclosed processes may differ from those shown in the figure. Depending on the embodiment, certain of the steps described above may be removed, others may be added. For instance, the various components illustrated in the figures may be implemented as software or firmware on a processor, controller, ASIC, FPGA, or dedicated hardware. Hardware components, such as controllers, processors, ASICs, FPGAs, and the like, can include logic circuitry. Furthermore, the features and attributes of the specific embodiments disclosed above may be combined in different ways to form additional embodiments, all of which fall within the scope of the present disclosure.

Although the present disclosure includes certain embodiments, examples and applications, it will be understood by those skilled in the art that the present disclosure extends beyond the specifically disclosed embodiments to other alternative embodiments or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A wound dressing comprising:
   a substantially flexible substrate with a first, wound-facing side supporting a plurality of electronic components and a second side opposite the first side, wherein the substrate comprises a plurality of perforations formed though the substrate, and wherein the plurality of perforations comprise walls on an exterior surface of the plurality of perforations;
   a first substantially stretchable coating applied to the first side of the substrate; and
   a second substantially stretchable coating applied to second side of the substrate;
   wherein the walls of the plurality of perforations are at least partially coated with at least one of the first or second stretchable coatings, wherein the at least one of the first or second stretchable coatings coated on the walls of the plurality of perforations is configured to allow fluid to flow through the plurality of perforations and to prevent liquid from contacting the plurality of electronic components.

2. The wound dressing of claim 1, further comprising a protective layer applied to the second side of the substrate, the protective layer configured to be removed to expose the substrate.

3. The wound dressing of claim 2, wherein the protective layer comprises first and second portions separated by a slit, the first portion extending over the second portion to cover the slit.

4. The wound dressing of claim 1, further comprising a first substantially non-stretchable coating applied to at least some of the plurality of electronic components.

5. The wound dressing of claim 4, wherein the first substantially non-stretchable coating is applied to at least some of the plurality of electronic components, the first stretchable coating applied over the first substantially non-stretchable coating.

6. A kit comprising the wound dressing of claim 1 and a negative pressure wound therapy device configured to supply negative pressure to a wound covered by the dressing.

7. The kit of claim 6, wherein the wound dressing and the negative pressure wound therapy device are sterile.

8. The wound dressing of claim 1, wherein the walls of the plurality of perforations are at least partially uniformly coated.

9. The wound dressing of claim 1, wherein the plurality of perforations are greater than or equal to 0.25 mm in diameter.

10. The wound dressing of claim 1, wherein the walls of the plurality of perforations comprise a plurality of grooves.

11. The wound dressing of claim 1, wherein the walls of the plurality of perforations are at least partially non-uniformly coated.

12. The wound dressing of claim 1, wherein the plurality of electronic components comprise a plurality of sensors configured to obtain measurements of a wound, at least some of the plurality of sensors interconnected by a plurality of electronic connections.

13. The wound dressing of claim 1, wherein the first stretchable coating covers substantially an entire area of the first side of the substrate.

14. The wound dressing of claim 1, wherein the second stretchable coating covers substantially an entire area of the second side of the substrate.

15. The wound dressing of claim 1, wherein the first substantially stretchable coating and the second stretchable coating comprise the same material.

16. The wound dressing of claim 1, wherein the walls of the plurality of perforations are at least partially coated with the second stretchable coating.

17. The wound dressing of claim 1, wherein the exterior wall of a perforation of the plurality of perforations comprises a first diameter and the perforation of the plurality of perforations comprises a second diameter formed after at least one of the coatings is applied to the exterior wall, wherein the second diameter is within the first diameter and smaller than the first diameter.

18. A method of manufacturing a wound dressing comprising:
   coating a first, wound-facing side of a substantially flexible substrate with a first coating, the substrate comprising a second side opposite the first side, the first side of the substrate supporting a plurality of electronic components, wherein the first coating is applied to at least some of the plurality of electronic components;
   perforating the substrate coated with the first coating to create a plurality of perforations through the substrate coated with the first coating, the plurality of perforations comprising walls and the plurality of perforations configured to facilitate passage of fluid through the substrate; and
   coating the second side of the substrate with a second coating, the second coating applied to the substrate positioned on a surface comprising a plurality of pins that extend through the plurality of perforations, and the second coating applied at least partially to the walls of the plurality of perforations, wherein the second coating on the walls of the plurality of perforations allows fluid to flow through the plurality of perforations and prevents liquid from contacting the plurality of electronic components.

19. A method of manufacturing a wound dressing comprising:
   coating a first, wound-facing side of a substantially flexible substrate with a first coating, the substrate comprising a second side opposite the first side, the first side of the substrate supporting a plurality of electronic components, wherein the first coating is applied to at least some of the plurality of electronic components;

perforating the substrate coated with the first coating to create a first plurality of perforations through the substrate coated with the first coating, the first plurality of perforations comprising walls and having a first diameter;

coating the second side of the substrate with a second coating, the second coating applied to fill the first plurality of perforations and covering the walls of the first plurality of perforations; and reperforating the substrate coated with the first coating and second coating to create a second plurality of perforations through the first plurality of perforations of the substrate coated with the first coating and the second coating, the second plurality of perforations comprising a second diameter and the second plurality of perforations is configured to facilitate passage of fluid through the substrate, wherein the second diameter is within the first diameter and is smaller than the first diameter.

* * * * *